(12) United States Patent
Moriwaki et al.

(10) Patent No.: US 12,277,204 B2
(45) Date of Patent: Apr. 15, 2025

(54) AUTHENTICATION SYSTEM AND AUTHENTICATION METHOD

(71) Applicant: Glory Ltd., Himeji (JP)

(72) Inventors: Sotaro Moriwaki, Himeji (JP); Shigenobu Nishida, Himeji (JP); Yuichi Fujita, Himeji (JP); Ayumi Kokubun, Himeji (JP); Koji Tanaka, Himeji (JP)

(73) Assignee: GLORY LTD., Himeji (JP)

( * ) Notice: Subject to any disclaimer, the term of this patent is extended or adjusted under 35 U.S.C. 154(b) by 504 days.

(21) Appl. No.: 17/486,961

(22) Filed: Sep. 28, 2021

(65) Prior Publication Data

US 2022/0012323 A1 Jan. 13, 2022

Related U.S. Application Data

(63) Continuation of application No. PCT/JP2020/013959, filed on Mar. 27, 2020.

(30) Foreign Application Priority Data

Mar. 29, 2019 (JP) ................. 2019-067039

(51) Int. Cl.
*G06F 21/32* (2013.01)
(52) U.S. Cl.
CPC .................... *G06F 21/32* (2013.01)
(58) Field of Classification Search
CPC ............ G06F 21/32; G06F 2221/2113; H04L 9/3231; H04L 63/0861; H04L 63/105
See application file for complete search history.

(56) References Cited

U.S. PATENT DOCUMENTS 11,303,631 B1 * 4/2022 Alexanian .............. G06F 21/45
2002/0152034 A1 10/2002 Kondo et al.
(Continued)

FOREIGN PATENT DOCUMENTS

EP 3422253 A1 1/2019
JP 2003-30154 A 1/2003
(Continued)

OTHER PUBLICATIONS

Office Action issued on Mar. 28, 2023, in corresponding Japanese patent Application No. 2019-067039, 8 pages.
(Continued)

*Primary Examiner* — Thaddeus J Plecha
(74) *Attorney, Agent, or Firm* — XSENSUS LLP

(57) ABSTRACT

To enhance convenience in an authentication system using a plurality of types of authentication, a terminal device transmits authentication data including a face image and a voice of a user, the position of the terminal device, to the server device. The server device uses the received authentication data to perform individual authentications including face authentication, voiceprint authentication, position adequacy verification. The server device applies adds up weighted scores of the individual authentications to calculate a comprehensive score. When the comprehensive score exceeds a first threshold, a high security operation is permitted. When the comprehensive score is not higher than the first threshold and exceeds a second threshold, a low security operation is permitted. When performing additional authentication using additional authentication data received from the terminal device, the comprehensive score further includes the additional authentication score, and the high security operation is permitted when the comprehensive score exceeds the first threshold.

16 Claims, 19 Drawing Sheets

(56) References Cited

U.S. PATENT DOCUMENTS

| | | | |
|---|---|---|---|
| 2006/0210119 A1* | 9/2006 | Willis | G06F 18/2415 |
| | | | 340/5.52 |
| 2006/0228005 A1 | 10/2006 | Matsugu et al. | |
| 2014/0331293 A1 | 11/2014 | Toole et al. | |
| 2016/0110528 A1 | 4/2016 | Gupta et al. | |
| 2016/0371812 A1 | 12/2016 | Tsukamoto et al. | |
| 2017/0169202 A1* | 6/2017 | Duggan | G06V 40/166 |
| 2018/0137265 A1 | 5/2018 | Tokuyama | |
| 2018/0309792 A1* | 10/2018 | Obaidi | G06F 21/32 |
| 2019/0392129 A1* | 12/2019 | Tsai | G06V 40/70 |
| 2020/0026830 A1* | 1/2020 | Alameh | H04L 63/105 |
| 2020/0134342 A1* | 4/2020 | Parupati | G06V 10/811 |
| 2021/0335364 A1† | 10/2021 | Shirai | |
| 2022/0116270 A1† | 4/2022 | Matsumura et al. | |

FOREIGN PATENT DOCUMENTS

| | | |
|---|---|---|
| JP | 2004-207784 A | 7/2004 |
| JP | 2006-293644 A | 10/2006 |
| JP | 2007-148968 A | 6/2007 |
| JP | 2007-280250 A | 10/2007 |
| JP | 2015-12304 A | 1/2015 |
| JP | 6077191 B1 | 2/2017 |
| JP | 2017-111608 A | 6/2017 |
| JP | 2017-535986 A | 11/2017 |
| JP | 2018-165980 A | 10/2018 |
| WO | 2016/040366 A1 | 3/2016 |

OTHER PUBLICATIONS

Extended European search report issued on Oct. 12, 2022, in corresponding European patent Application No. 20784657.7, 8 pages.

International Search Report and Written Opinion mailed on Jun. 16, 2020, received for PCT Application PCT/JP2020/013959, Filed on Mar. 27, 2020, 10 pages including English Translation.

\* cited by examiner
† cited by third party

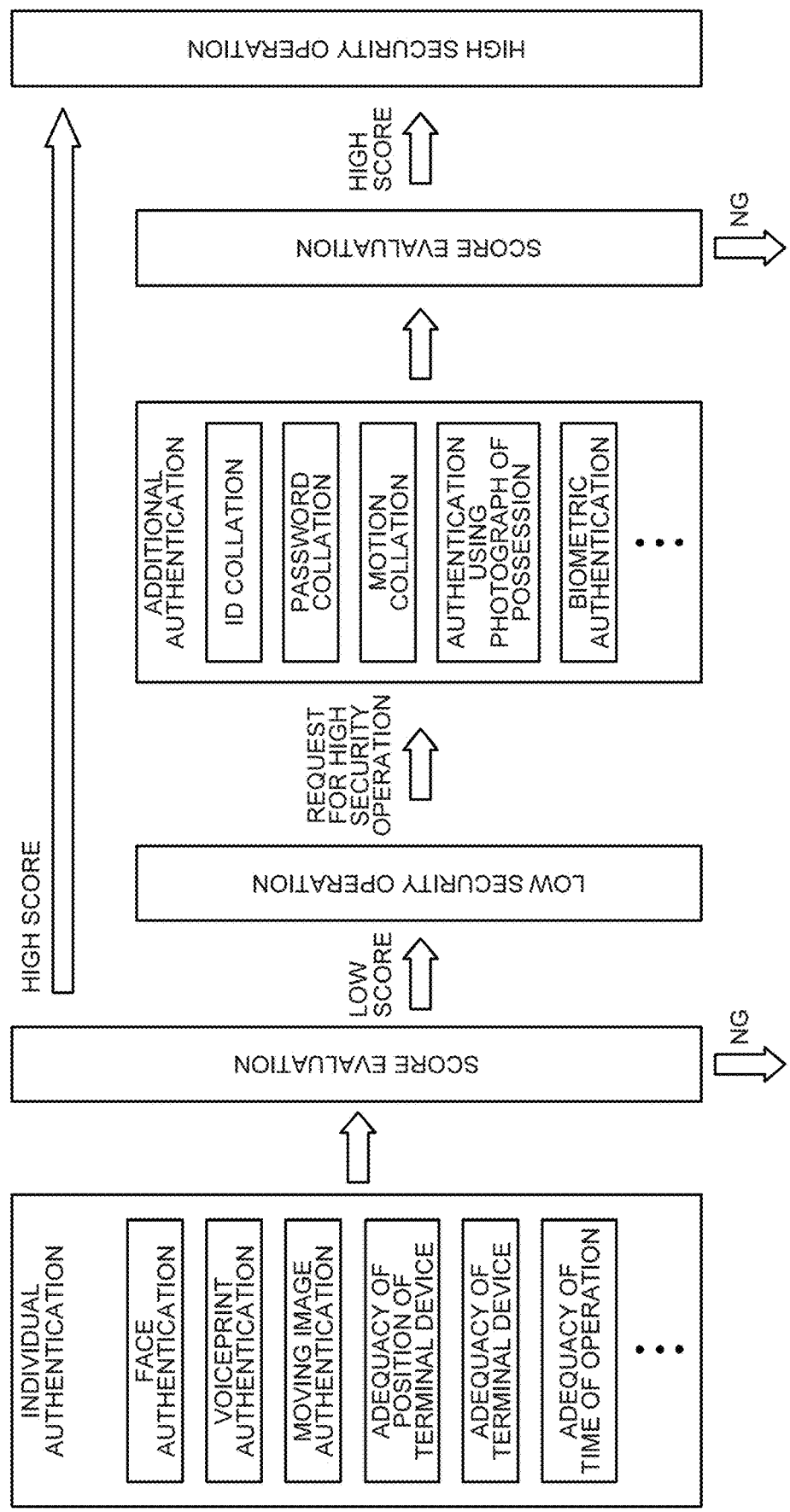

FIG.7

| CONDITION | CONTROL |
|---|---|
| IMAGE QUALITY OF CAMERA IS LOW, IMAGE IS TAKEN IN DARK PLACE | REDUCE WEIGHT ON FACE AUTHENTICATION |
| SOUND QUALITY OF MICROPHONE IS LOW, AMBIENT SOUND NOISE IS LOUD | REDUCE WEIGHT ON VOICEPRINT AUTHENTICATION |
| REGISTRATION/UPDATE OF SPECIFIC FACTOR | PERSONAL AUTHENTICATION USING ANOTHER FACTOR |
| PROCESS REQUIRING SPECIFIC ID | CUTOFF BASED ON AUTHENTICATION SCORE OBTAINED USING REQUIRED ID |
| TEMPORARY MEASURE DUE TO DISASTER, ETC. | REDUCE WEIGHT ON AUTHENTICATION USING CERTIFICATE OR POSSESSION |
| NEW ACQUISITION OF COMPREHENSIVE AUTHENTICATION ID | REQUIRE AUTHENTICATION USING ID DIFFICULT TO DUPLICATE INEVITABLE |
| WEARING OF MASK | REDUCE WEIGHT ON FACE AUTHENTICATION, USE AREA AROUND EYES INTENSIVELY |

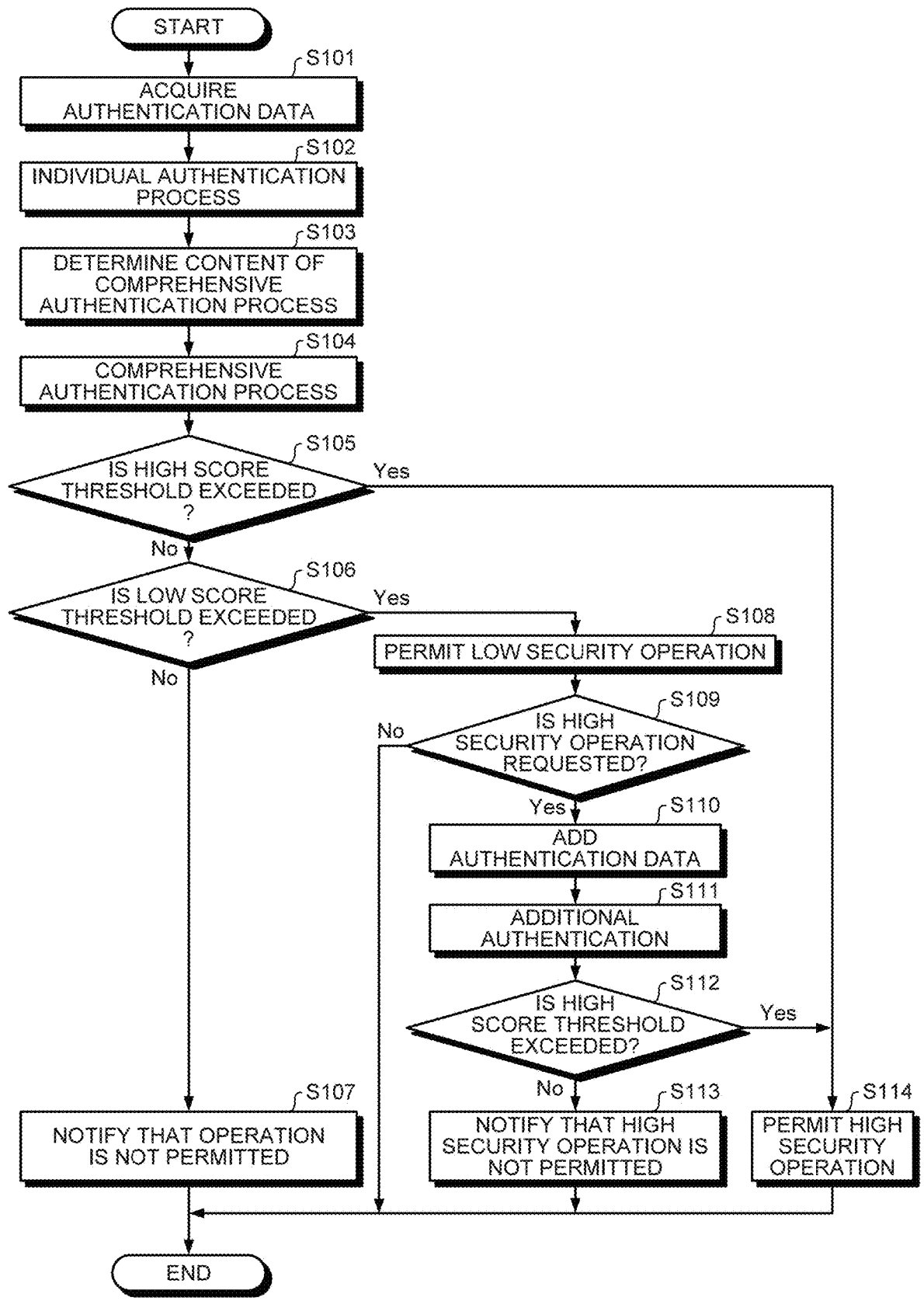

PRE-APPROVED AUTHENTICATION

DURING USE

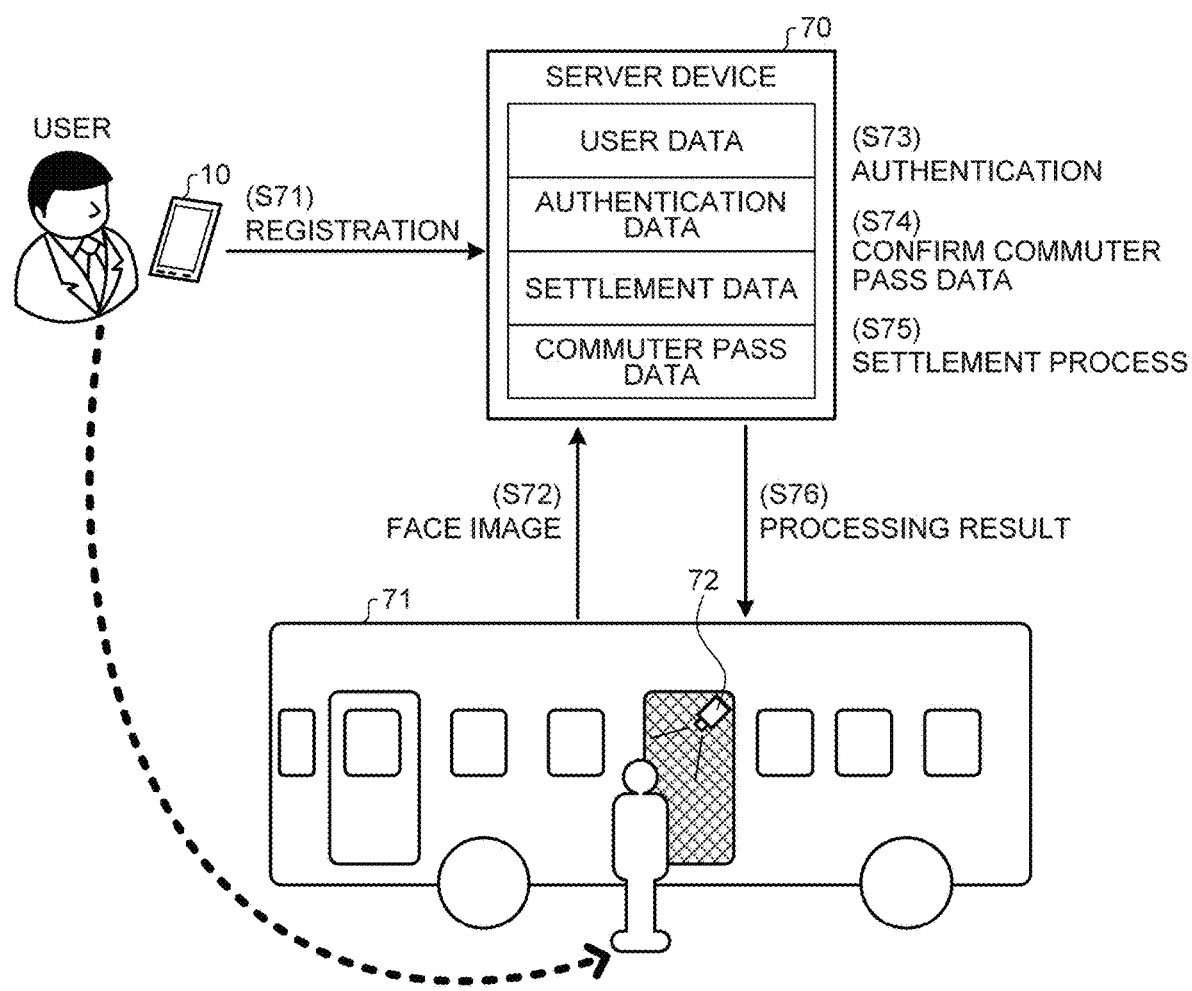

AUTHENTICATION SYSTEM AND AUTHENTICATION METHOD

CROSS-REFERENCE TO RELATED APPLICATIONS

The present application is a continuation of, and claims priority to, International application PCT/JP2020/013959, filed Mar. 27, 2020, which claims priority to JP 2019-067039, filed Mar. 29, 2019, and the entire contents of both are incorporated herein by reference.

TECHNICAL FIELD

The present disclosure relates to an authentication system and an authentication method using a plurality of types of authentication.

BACKGROUND

Conventionally, authentication of a user has been performed by registering a password, biometric information, or the like in advance, and determining whether or not a password or biometric information received from the user matches the registered information.

Furthermore, in order to ensure higher security and authentication accuracy, one-time password authentication using a single-use password, and multi-factor authentication using a plurality of types of authentication have also been adopted. For example, Japanese Laid-Open Patent Publication No. 2017-111608 discloses multi-factor authentication using two or more pieces of information among biometric information, possession information, and knowledge information. Meanwhile, Japanese Laid-Open Patent Publication No. 2017-535986 (Japanese Translation of PCT International Application) discloses multi-factor authentication using a plurality of pieces of biometric information such as a face and a voice.

SUMMARY

In the conventional art, however, flexible use of authentication according to purpose and situation cannot be performed, resulting in reduction in convenience. For example, in the configuration where whether or not to permit an operation is determined based on whether or not authentication of a user is success or failure, if the authentication has failed, no operations can be performed. In actuality, the level of security required for each operation varies depending on the content of each operation. However, since strictness of authentication needs to be set according to an operation requiring the highest security level, excessively strict authentication is imposed on an operation having a lower security level, resulting in a situation that convenience to the user is reduced.

When authentication is performed in a dark place, effectiveness of authentication based on an image is reduced. When authentication is performed in a noisy place, effectiveness of authentication based on a voice is reduced. If authentication can be performed in an environment with suitable brightness and sound, influence of the environment can be reduced. However, when authentication is performed by using a portable terminal device in various environments, accuracy of authentication may be degraded due to influence of the environment.

Therefore, in the multi-factor authentication using a plurality of types of authentication, it is an important issue to realize flexible use according to purpose and situation, and enhance convenience.

The present disclosure has been made in view of the problem, as well as other problems, of the conventional art, and the present disclosure addresses these issues, as discussed here, with an authentication system using a plurality of types of authentication to enhance convenience.

BRIEF DESCRIPTION OF THE DRAWINGS

FIG. 6 illustrates authentication processing performed by the server device.

FIG. 7 illustrates control for a comprehensive score calculation method.

FIG. 8 is a flowchart showing a processing procedure performed by the server device.

FIG. 18 illustrates a case where authentication is used for regular use of transportation.

DETAILED DESCRIPTION OF THE DRAWINGS

Hereinafter, exemplary embodiments of an authentication system and an authentication method according to the present disclosure will be described in detail with reference to the accompanying drawings.

<Authentication System>

Figure 1:
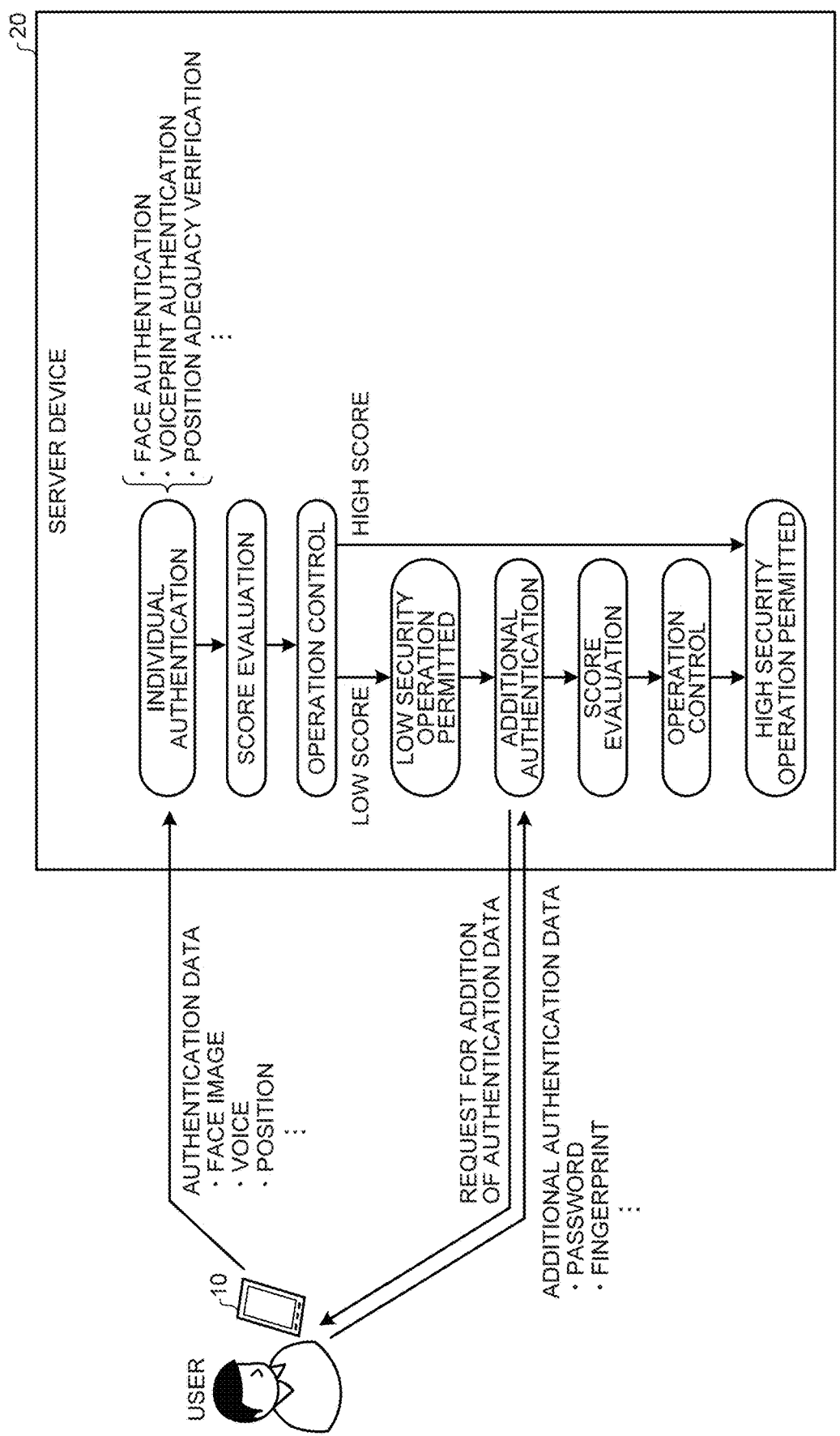
FIG. 1 illustrates an authentication system according to an embodiment.

FIG. 1 illustrates an exemplary authentication system according to the present disclosure. A terminal device 10 shown in FIG. 1 acquires a plurality of types of authentication data to be used for authentication of a user, and transmits the data to a server device 20. The server device 20 performs multi-factor authentication by using the plurality of types of authentication data received from the terminal device 10, and permits the user to perform an operation according to the result of the authentication.

Specifically, the terminal device 10 transmits, as the authentication data, a face image and a voice of the user, the position of the terminal device 10, and the like to the server device 20. The server device 20 performs face authentication, voiceprint authentication, position adequacy verification, and the like by using the authentication data received from the terminal device 10. These authentications are individual authentications using the respective pieces of authentication data, and each of the individual authentications outputs an authentication score.

The authentication score is an evaluation value indicating the result of the authentication. For example, the face authentication outputs, as the authentication score, the degree of matching between the face image in the authentication data and the face image registered in advance for the authentication. Likewise, the voiceprint authentication outputs, as the authentication score, the degree of matching between the voiceprint of the voice in the authentication data and the voiceprint registered in advance for the authentication. The position adequacy verification outputs, as the authentication score, the degree of adequacy of the position of the terminal device 10.

The server device 20 evaluates the authentication scores of the individual authentications, and controls operations to be permitted for the user. Specifically, the server device 20 applies weights on a plurality of authentication scores acquired through a plurality of individual authentications, and adds up the scores to calculate a comprehensive score. If the comprehensive score is higher than a first threshold, the server device 20 permits all operations including an operation requiring high security (high security operation). If the comprehensive score is lower than or equal to the first threshold but higher than a second threshold, the server device 20 permits only a part of the operations (low security operation) excluding the high security operation. For convenience sake, the first threshold is referred to as "high score threshold", and the second threshold is referred to as "low score threshold" in the following description. Moreover, permitting all the operations including the high security operation is referred to as "permitting high security operation", and permitting only the low security operation is referred to as "permitting low security operation" in the following description.

If the comprehensive score is lower than or equal to the low score threshold, it means that the user failed in the authentication, and the user is prohibited from performing all the operations including the low security operation. Calculation of the comprehensive score may be performed on the condition that an authentication score of a predetermined type of individual authentication exceeds a threshold set for the authentication score. If the authentication score of the predetermined type of individual authentication is lower than the threshold, it means that the authentication fails regardless of other authentication scores, and all the operations are prohibited.

Even when the server device 20 has prohibited the high security operation while permitting the low security operation after the authentication, the server device 20 can permit the high security operation by performing additional authentication.

Specifically, if the user requests the high security operation in the state where only the low security operation is permitted for the user, the server device 20 requests the terminal device 10 to acquire additional authentication data. For example, a password, a fingerprint, or the like may be used as the additional authentication data. Upon receiving the additional authentication data from the terminal device 10, the server device 20 performs additional authentication such as password collation, fingerprint authentication, or the like. The additional authentication is also individual authentication, and outputs an authentication score. The server device 20 calculates the comprehensive score by further using the authentication scores of the additional authentications. If the comprehensive score exceeds the high score threshold, the server device 20 permits the user to perform the high security operation As described above, the server device 20 acquires the plurality of types of authentication data corresponding to the plurality of types of authentication, performs the individual authentications by using the plurality of types of authentication data, obtains the comprehensive authentication result from the results of the individual authentications, and controls stepwise the range of operations to be permitted for the user, according to the comprehensive authentication result. This enables flexible use of the authentication according to the purpose without imposing excessively strict authentication on the low security operation, whereby convenience is enhanced for the user.

Even when the score of specific authentication is lowered due to influence of an environment with noise, insufficient brightness, or the like and thereby the high security operation is prohibited as the authentication result, the high security operation may be permitted by performing additional authentication. This enables flexible use of the authentication according to the situation, whereby convenience is enhanced for the user.

<Configurations of System and Devices>

Figure 2:
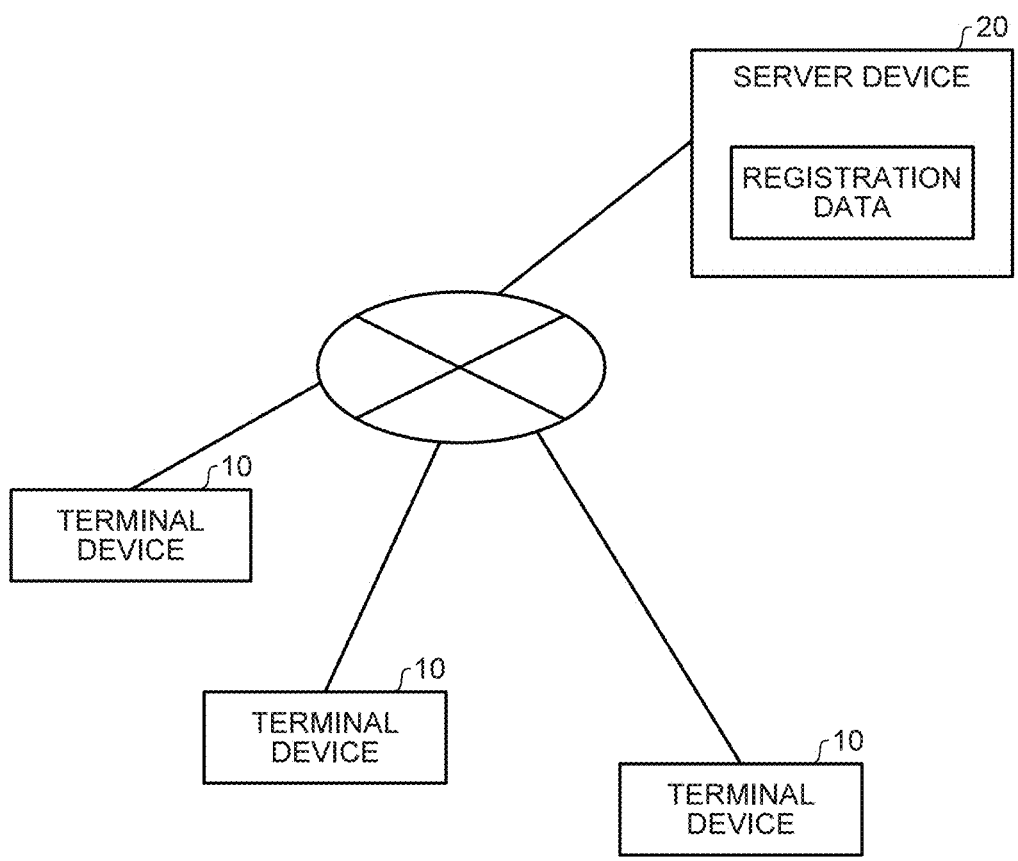
FIG. 2 illustrates a system configuration of the authentication system.

FIG. 2 illustrates the system configuration of the authentication system. As shown in FIG. 2, the server device 20 is connected to a plurality of terminal devices 10 via a predetermined network. The predetermined network may be an open network such as the Internet, or a closed network such as an intra-company network or a financial network.

The server device 20 stores therein face images, voices, and the like of users previously prepared as registration data. Upon receiving authentication data from any of the terminal devices 10, the server device 20 performs authentication by comparing the authentication data with the registration data according to need.

Figure 3:
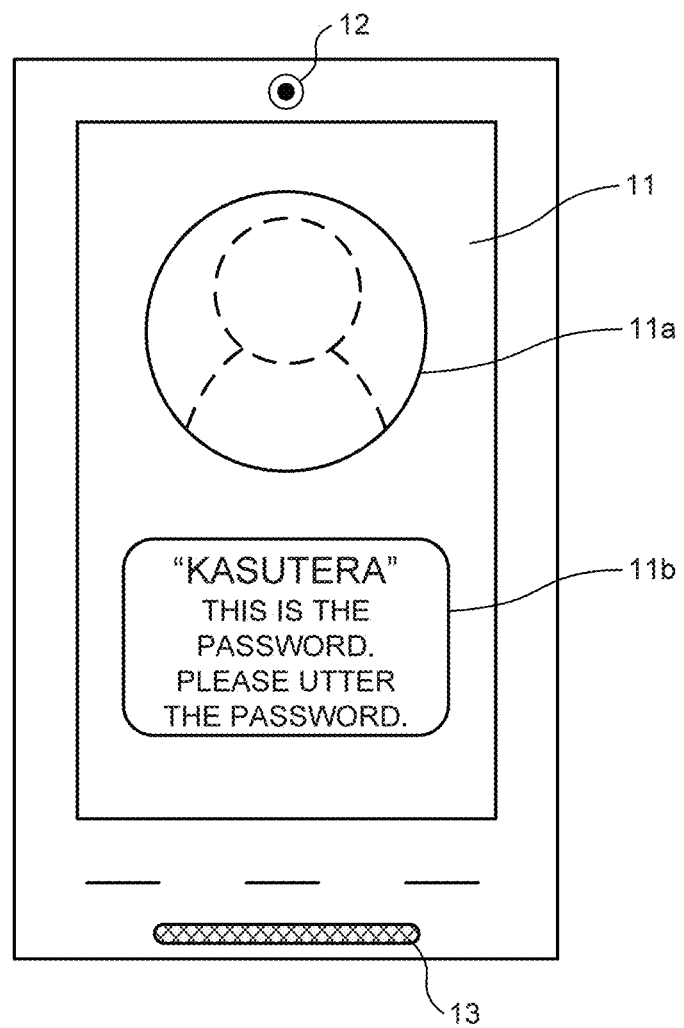
FIG. 3 shows an external configuration of a terminal device.

FIG. 3 shows the external configuration of each terminal device 10. For example, a smartphone is used as the terminal device 10. The terminal device 10 includes a display/operation unit 11, a camera 12, and a microphone 13. The display/operation unit 11 is a touch panel display or the like. The camera 12 is disposed to be able to take an image of a user viewing a screen of the display/operation unit 11. The microphone 13 may be appropriately disposed to be able to acquire the voice of the user.

As shown in FIG. 3, the display/operation unit 11 can display a face image 11*a* of the user taken by the camera 12, and a message 11*b* indicating a password to be uttered by the user. The face image 11*a* of the user can be replaced with a predetermined model face image when the face image 11*a* is to be displayed. The display of the model face image will be described later in detail.

Figure 4:
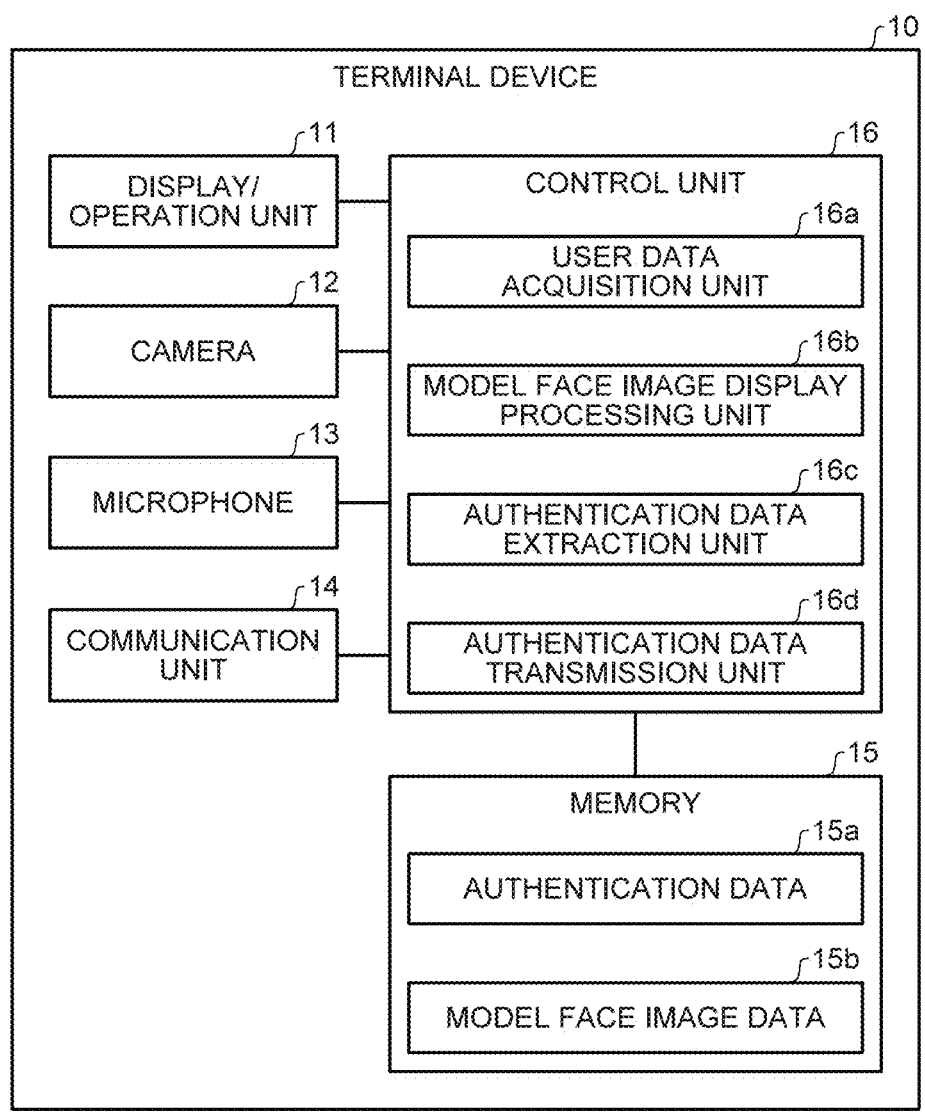
FIG. 4 is a functional block diagram showing a functional configuration of the terminal device.

FIG. 4 is a functional block diagram showing the functional configuration of the terminal device 10. As shown in FIG. 4, the terminal device 10 includes a communication unit 14, a memory 15, and a control unit 16 in addition to the display/operation unit 11, the camera 12, and the microphone 13 already described.

The communication unit 14 is a communication interface to communicate with the server device 20 and the like via the predetermined network. The memory 15 is a memory device such as a non-volatile memory. The memory 15 stores therein various programs, authentication data 15a, model face image data 15b, and the like. The authentication data 15a includes image data and moving image data taken by the camera 12, voice data collected by the microphone 13, and the like. The model face image data 15b includes a model face image to be displayed instead of the face image of the user.

The control unit 16 is a CPU (Central Processing Unit) or the like. The control unit 16 reads out a predetermined program from the memory 15 and executes the program to implement functions of a user data acquisition unit 16a, a model face image display processing unit 16b, an authentication data extraction unit 16c, and an authentication data transmission unit 16d. In an exemplary implementation, control unit 16 is encompassed by or may include processing circuitry which will be discussed later with respect to FIG. 19.

The user data acquisition unit 16a acquires an image and a voice of the user. Specifically, the user data acquisition unit 16a acquires an image taken by the camera 12, a voice acquired by the microphone 13, and the like. Moreover, the user data acquisition unit 16a can display and control, in real time, the image taken by the camera 12 on the display/operation unit 11.

When displaying the image taken by the camera 12 on the display/operation unit 11, the model face image display processing unit 16b can display a model face image instead of the face image of a user. Specifically, the model face image display processing unit 16b detects a face image of the user from the image taken by the camera 12. The model face image display processing unit 16b determines the area of a face image part in the image, and the orientation of the user's face based on the face image. Then, the model face image display processing unit 16b refers to the model face image data 15b to generate a model face image in accordance with the determined area and orientation of the user's face of the face image, and displays the generated model face image on the display/operation unit 11.

When the image taken by the camera 12 is displayed as it is on the display/operation unit 11, the user can check what the taken image is like and therefore, the user can adjust the imaging area and orientation of the user's face so that the camera 12 can take a face image appropriately for authentication. Meanwhile, some users desire to avoid displaying their own images on the display/operation unit 11. Thus, a face image of such a user can be replaced with a model face image when being displayed, whereby the user can adjust the imaging area and orientation so that a face image for authentication can be appropriately taken by the camera 12, without displaying his/her real face image.

It is possible to arbitrarily set the appearance of the model face image to be generated and displayed. The appearance of the model may be selectable by the user. The user may purchase a favorite appearance of the model. Alternatively, the appearance may be given to the user as a privilege. Moreover, an appearance may be available only when a specific condition is satisfied. For example, the user may be allowed to use the appearance of a character corresponding to a theme park on the condition that the user is present in the theme park. For another example, the user may be allowed to use the appearance of a character related to a promotion on the condition that the promotion is in progress. Thus, the appearance of the model can be dealt with as a commodity or a privilege. The appearance of the model may be used for an advertisement.

The authentication data extraction unit 16c extracts, from the data acquired by the user data acquisition unit 16a, a plurality of types of authentication data corresponding to a plurality of types of authentication to be performed. Specifically, the authentication data extraction unit 16c extracts, as the authentication data, a face image, a voice, and the content of utterance of the user. These pieces of authentication data are used for authentications such as face authentication, voiceprint authentication, face-voice matching authentication, and password collation.

The authentication data extraction unit 16c acquire, as the authentication data, the position of the terminal device 10, identification information (ID) of the terminal device 10, user ID, biometric information of the user, and the like. The position of the terminal device 10 may be specified through wireless communication by the communication unit 14, or by using a GPS or the like. Alternatively, the history of processing regarding room entry/exit may be used for position information. As for the ID of the terminal device 10, the unique ID of the terminal device 10 may be read out and used. The user ID may be stored in advance in a memory 15 or the like, or the user may be prompted to input the user ID. The biometric information can be acquired by a fingerprint sensor, for example.

The authentication data transmission unit 16d transmits the authentication data extracted by the authentication data extraction unit 16c, to the server device 20. When a user, whose data for authentication has been already registered, transmits the authentication data for the authentication, the authentication data transmission unit 16d transmits the authentication data with an authentication request flag, to the server device 20. When a user, whose data for authentication is to be newly registered, the authentication data transmission unit 16d transmits the authentication data with a registration request flag, to the server device 20.

Figure 5:
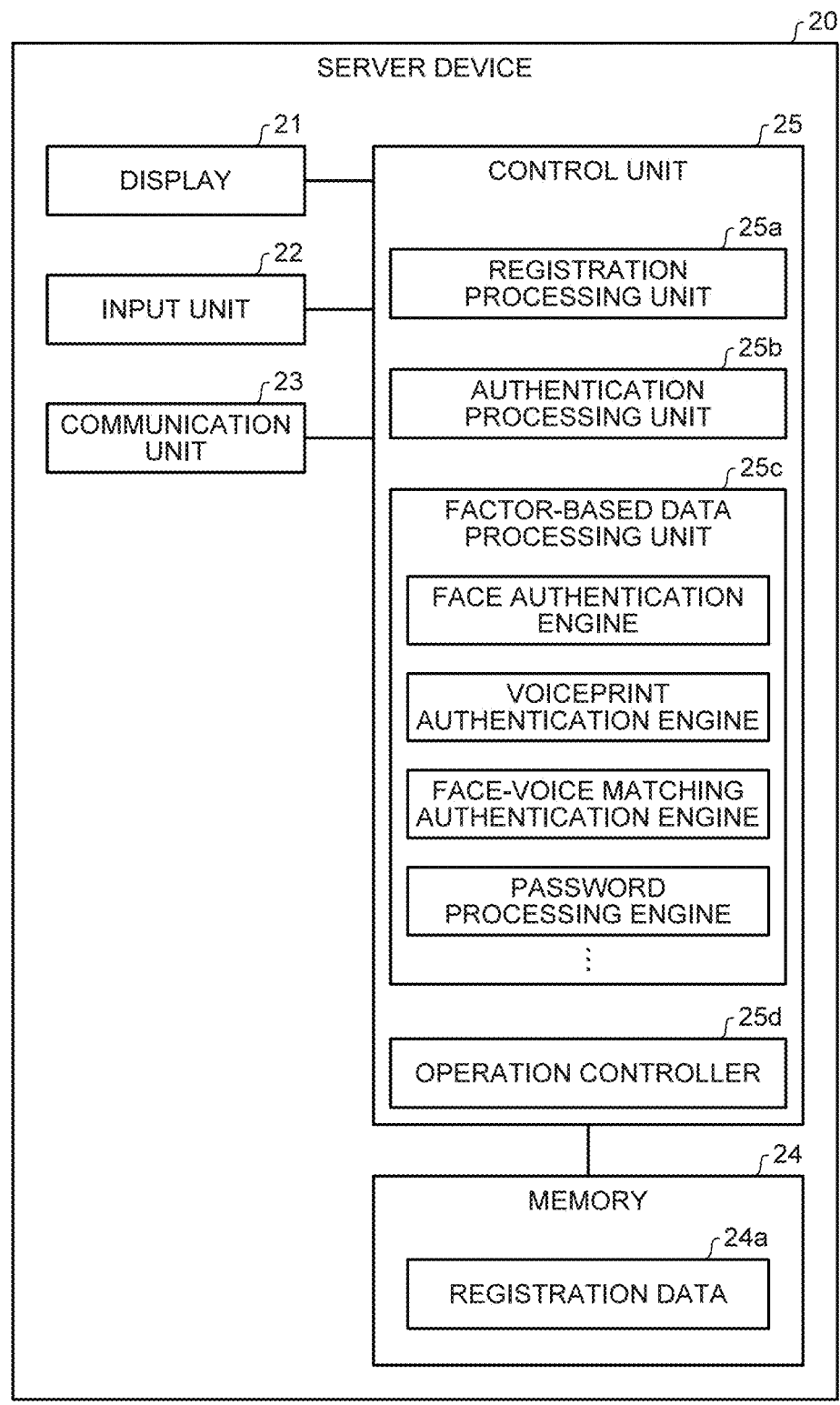
FIG. 5 is a functional block diagram showing a functional configuration of a server device.

FIG. 5 is a functional block diagram showing the functional configuration of the server device 20. As shown in FIG. 5, the server device 20 includes a display 21, an input unit 22, a communication unit 23, a memory 24, and a control unit 25.

The display 21 is a display device such as a liquid crystal display. The input unit 22 is an input device such as a keyboard and a mouse. The communication unit 23 is a communication interface to communicate with the terminal devices 10. The memory 24 is a memory device such as a hard disk device. The memory 24 stores therein face images, voices, and the like of users as registration data 24a.

The control unit 25 controls the entirety of the server device 20. The control unit 25 includes a registration processing unit 25a, an authentication processing unit 25b, a factor-based data processing unit 25c, and an operation control unit 25d. In actuality, programs corresponding to these functional units are stored in a ROM or a non-volatile memory, and the programs are loaded to a CPU and executed, thereby causing the CPU to perform the processes corresponding to the registration processing unit 25a, the authentication processing unit 25b, the factor-based data processing unit 25c, and the operation control unit 25d. In an exemplary implementation, control unit 25 is encompassed by or may include processing circuitry which will be discussed later with respect to FIG. 19.

The registration processing unit 25a stores, in the memory 24, a face image, a voice, and the like of a user as registration data 24a. Specifically, upon receiving authentication data to which a registration request flag is attached, the registration processing unit 25a causes the factor-based data processing unit 25c to process the authentication data, and performs registration on the condition that validity of the authentication data is confirmed. The validity of the authentication data can be confirmed through password collation or face-voice matching authentication performed by the factor-based data processing unit 25c. The face image and the voice included in the authentication data are objects to be registered in the registration data 24a. The face image and the voice may be registered as they are, or data indicating the feature of the face and data indicating the feature of the voiceprint may be registered in the registration data 24a.

The authentication processing unit 25b performs authentication of the user, based on a request from the terminal device 10. Specifically, upon receiving authentication data to which an authentication request flag is attached, the authentication processing unit 25b causes the factor-based data processing unit 25c to process the authentication data, applies weights to authentication scores of individual authentications performed by the factor-based data processing unit 25c, and adds up the scores, thereby calculating a comprehensive score.

The authentication processing unit 25b can appropriately select the authentication scores to be used for calculation of the comprehensive score. Likewise, the authentication processing unit 25b can appropriately set the weight to be applied to each of the selected authentication scores. It can be set that calculation of the comprehensive score is performed on the condition that the authentication score of a predetermined type of authentication exceeds a threshold that is previously prepared for the authentication score.

The authentication processing unit 25b varies the type and weight of the authentication score to be used, according to a situation such as authentication data acquisition environment. For example, the authentication processing unit 25b reduces the threshold for the face authentication when brightness is insufficient. For example, the authentication processing unit 25b reduces the weight applied to the authentication score of the voiceprint authentication in a noisy environment. When detecting, from the result of image processing, that the user wears a mask, the authentication processing unit 25b can reduce the weight applied to the authentication score of the face authentication. Moreover, when detecting that the user wears a mask, the authentication processing unit 25b can perform calculation of the comprehensive score by using the authentication score obtained from a partial area, such as an area around eyes, in which the mask has no influence.

The situation such as the authentication data acquisition environment may be determined based on another data. For example, the terminal device 10 may be provided with a light sensor to acquire illuminance data indicating the peripheral brightness, and may transmit the illuminance data together with the image data to the server device 20. Alternatively, the situation such as the authentication data acquisition environment may be determined based on the authentication data itself. For example, the brightness at the time of imaging can be determined by analyzing the image data to evaluate unevenness in brightness distribution. Moreover, whether or not the user wears a mask can be determined by analyzing the image data.

The authentication processing unit 25b can acquire authentication data for additional authentication, and cause the factor-based data processing unit 25c to calculate an authentication score of the authentication data for additional authentication. Upon acquiring the authentication score of the additional authentication, the authentication processing unit 25b updates the comprehensive score by adding the acquired authentication score of the additional authentication.

The factor-based data processing unit 25c performs data processing individually for each of the factors included in the authentication data. The factor-based data processing unit 25c includes a face authentication engine, a voiceprint authentication engine, a face-voice matching authentication engine, a password processing engine, and the like.

The face authentication engine performs a process of comparing the face image included in the authentication data with the face image in the registration data 24a to determine the degree of matching. The voiceprint authentication engine performs a process of comparing the voice included in the authentication data with the voice in the registration data 24a to determine the degree of matching. The face-voice matching authentication engine performs a process of determining the degree of matching between the shape of a mouth in the face image at the time of utterance and the recognized syllable. The password processing engine performs a process of determining whether or not the content of utterance included in the authentication data matches the password displayed on the terminal device 10. The password displayed by the terminal device 10 may be a password registered in advance, or a one-time password that can be used only once. The password registered in advance can be stored in the registration data 24a. The single-use one-time password may be, for example, issued by the password processing engine and transmitted to the terminal device 10.

The operation control unit 25d controls operations to be permitted for the user, based on the comprehensive score. Specifically, when the comprehensive score exceeds the first threshold (high score threshold), the operation control unit 25d permits all the operations including the operation requiring high security (high security operation). If the comprehensive score is lower than or equal to the first threshold but exceeds the second threshold (low score threshold), the operation control unit 25d permits only a part of the operations (low security operation) excluding the high security operation.

If the comprehensive score is lower than or equal to the low score threshold, the operation control unit 25d determines that the authentication has failed, and prohibits all the operations including the low security operation.

<Description of Processing>

FIG. 6 illustrates authentication processing performed by the server device 20. FIG. 6 shows an example in which, face authentication, voiceprint authentication, moving image authentication, adequacy of position of terminal device, adequacy of terminal device, adequacy of time of operation, and the like are performed by the factor-based data processing unit 25c as individual authentication processes. Although any individual authentication processes can be used, it is desirable that processes to be used have less burden on the user.

The authentication processing unit 25b calculates a comprehensive score from authentication scores of the individual authentications. The authentication processing unit 25b evaluates the calculated comprehensive score, and permits the high security operation if the score is high (comprehensive score>high score threshold), or selectively permits the low security operation if the score is low (high score threshold comprehensive score>low score threshold). If the comprehensive score is lower than or equal to the low score threshold, the authentication processing unit 25b determines that the authentication has failed and prohibits all the operations.

Upon receiving a request for the high security operation while the low security operation is selectively permitted, the authentication processing unit 26b acquires data for additional authentication, and causes the factor-based data processing unit 25c to perform individual authentication. FIG. 6 shows, as examples of additional authentication, user ID collation, password collation, motion collation for causing the user to perform a motion registered in advance, authentication using a photograph of a possession of the user, and biometric authentication using a fingerprint or the like. Although any authentication can be used as the additional authentication, it is desirable that greater importance is placed on achieving a higher authentication score than reducing the operation burden on the user.

The authentication processing unit 25b calculates the comprehensive score by further using the authentication score of the additional authentication, and evaluates the calculated comprehensive score. If the result of the score evaluation is that the comprehensive score is high (comprehensive score>high score threshold), the authentication processing unit 25b permits the high security operation. Meanwhile, if the comprehensive score is not high in spite of the additional authentication, the authentication processing unit 25b does not permit the high security operation.

FIG. 7 illustrates control of a comprehensive score calculation method. As shown in FIG. 7, if the image quality is low because the performance of the camera is low or if the image is taken in a dark place, the comprehensive score calculation method is controlled such that the weight on the face authentication in the comprehensive score calculation is reduced. Likewise, if the sound quality is low because the performance of the microphone is low or if ambient sound noise is loud, the weight on the voiceprint authentication in the comprehensive score calculation is reduced.

When registration and update of data are performed for a specific factor, the user is verified through authentication using another factor. When a process requiring a specific ID is performed, cutoff for rejecting the process is performed based on whether or not an authentication score obtained using the required ID exceeds a threshold.

A temporary measure may need to be taken at the time of disaster. In such a case, it may be difficult for the user to prepare a certificate or a possession and therefore, the comprehensive score calculation method is controlled such that the weight on authentication using a certificate or a possession is reduced. When a user newly acquires an ID for a comprehensive authentication process, the user has to be authenticated by using an ID that is difficult to duplicate (a driver's license, a passport, or the like). When the user wears a mask, the weight on the face authentication is reduced or an area around eyes in the face image is intensively used for the face authentication.

FIG. 8 is a flowchart showing a processing procedure performed by the server device 20. Firstly, the authentication processing unit 25b of the server device 20 acquires authentication data from the terminal device 10 (step S101). The factor-based data processing unit 25c performs an individual authentication process using the acquired authentication data (step S102).

The authentication processing unit 103 determines a processing method for comprehensive score calculation, i.e., the content of a comprehensive authentication process, based on the authentication data acquisition environment or the like (step S103). The authentication processing unit 103 calculates a comprehensive score to perform the comprehensive authentication process (step S104).

If the comprehensive score exceeds the high score threshold (step S105; Yes), the operation control unit 25d permits the high security operation (step S114), and ends the processing. If the comprehensive score is lower than or equal to the high score threshold (step S105; No), the operation control unit 25d compares the comprehensive score with the low score threshold (step S106).

If the comprehensive score is lower than or equal to the low score threshold (step S106; No), the operation control unit 25d notifies that no operation is permitted (step S107), and ends the processing. Meanwhile, when the comprehensive score exceeds the low score threshold (step S106; Yes), the operation control unit 25d permits the low security operation (step S108).

If a request for the high security operation is not received after step S108 (step S109; No), the processing is ended. Meanwhile, upon receiving a request for the high security operation after step S108 (step S109; Yes), the authentication processing unit 25b adds authentication data (step S110), and the factor-based data processing unit 25c performs individual authentication by using the added authentication data (step S111) to update the comprehensive score.

If the updated comprehensive score exceeds the high score threshold (step S112; Yes), the operation control unit 25d permits the high security operation (step S114), and ends the processing. If the updated comprehensive score is lower than or equal to the high score threshold (step S112; No), the operation control unit 25d notifies that the high security operation is not permitted (step S113), and ends the processing.

Figure 9A:
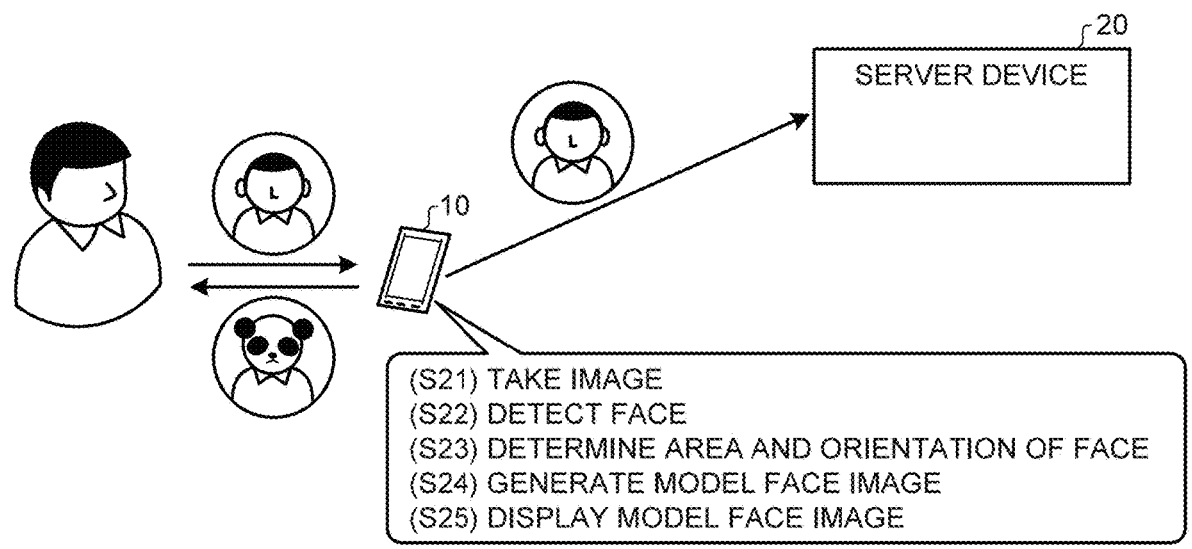
FIG. 9A illustrates how to display a model face image.

FIG. 9 illustrates how to display a model face image. As shown in FIG. 9A, the terminal device 10 captures an image of the user (S21), and detects a face from the captured image (S22). Then, the terminal device 10 determines the area of a face image part of the captured image, and the orientation of a user's face based on the face image (S23). The model face image display processing unit 16b generates a model face image to be displayed in accordance with the area and orientation of the face image (S24), and displays the model face image on the display/operation unit 11 (S25). The terminal device 10 transmits the detected face image of the user to the server device 20.

Figure 9B:
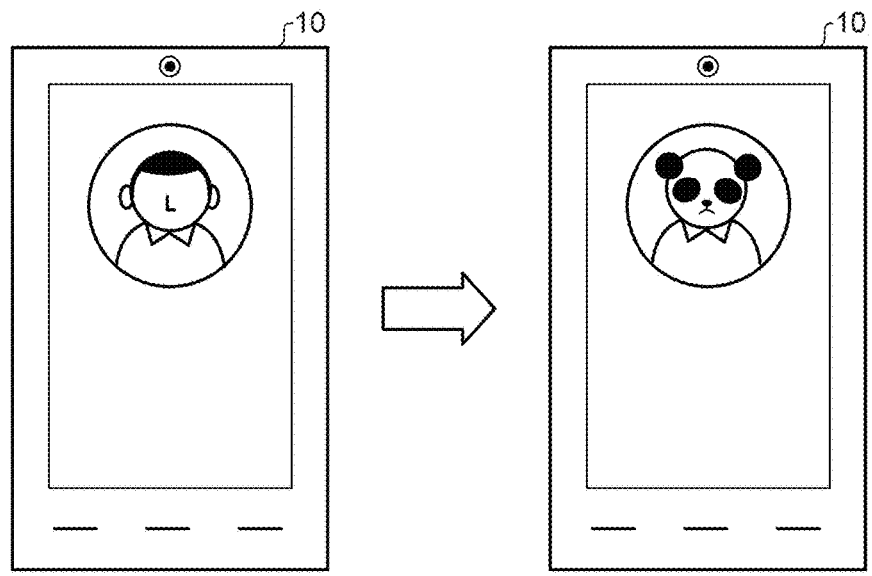
FIG. 9B illustrates how to display a model face image.

That is, the terminal device 10 captures the face image of the user and transmits the same to the server device 20, but uses the model face image as the image to be displayed for the user. FIG. 9B shows an example in which the face image of the user is replaced with the model face image simulating the appearance of a panda.

Next, authentication processing performed for a user wearing a mask will be described. For example, in face authentication, an authentication score is calculated by using an image of the entire face of the user, and the user is identified as him/herself on the condition that the authentication score is 90 or higher. In this configuration, if the user wears a mask, a part of the face is hidden by the mask, and the authentication score is reduced.

Figure 10:
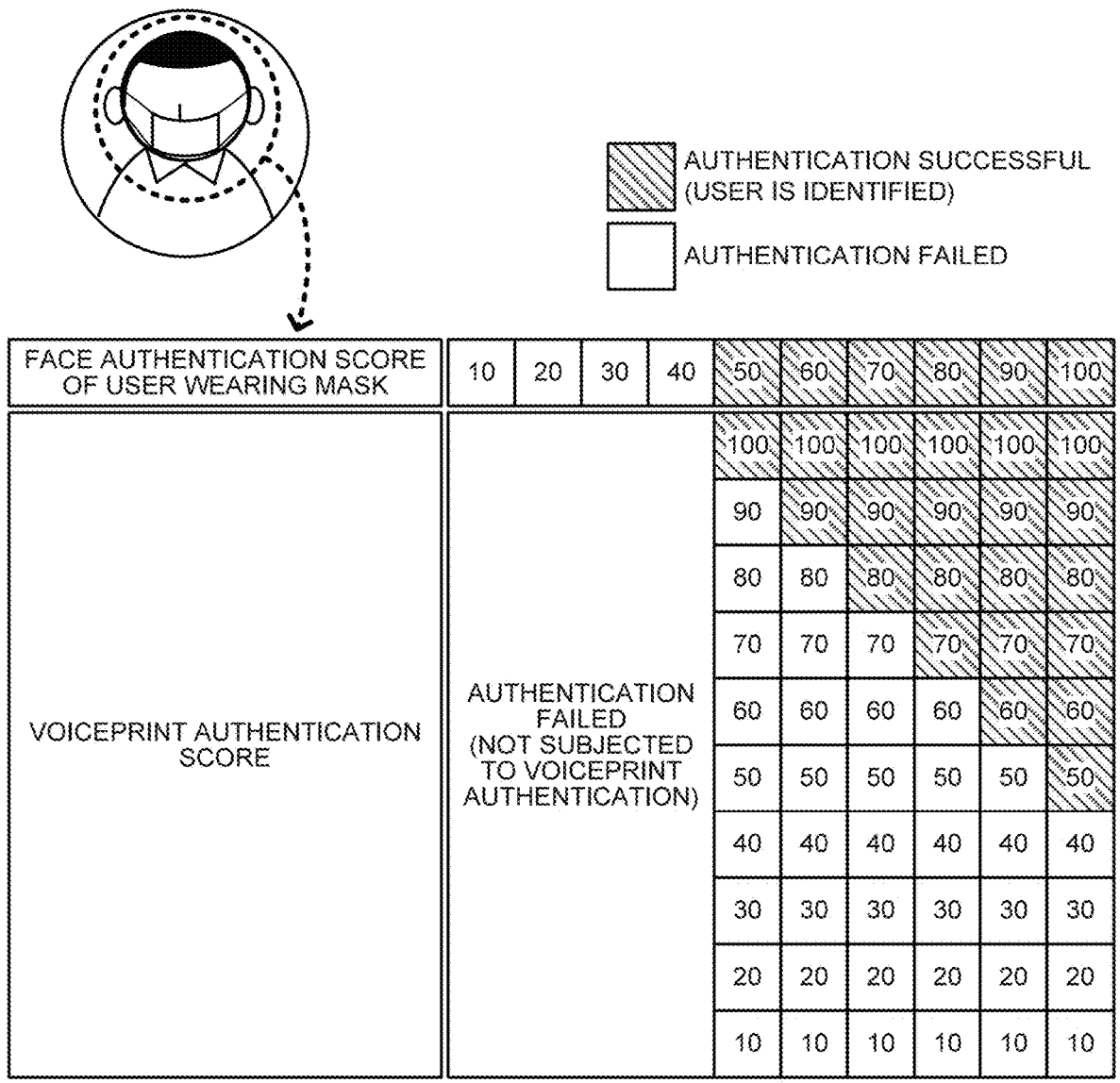
FIG. 10 illustrates a combination of face authentication and voiceprint authentication.

Thus, when the user wears a mask, the user can be identified by using a combination of face authentication and voiceprint authentication. FIG. 10 illustrates the combination of face authentication and voiceprint authentication.

In FIG. 10, even when the authentication score of the face authentication is 50, the user is identified as him/herself if the authentication score of the voiceprint authentication is 100. Likewise, even when the authentication score of the voiceprint authentication is 60, the user is identified as him/herself if the authentication score of the face authentication is 90. When the authentication score of the face authentication is 40 or lower, since the user is highly likely to be another person, it is determined that the authentication has failed without performing the voiceprint authentication.

In an alternative method, when the user wears a mask, eye authentication in which an area around eyes in the face image is selectively used for authentication may be adopted instead of the face authentication in which the image of the entire face is used. In this case, an authentication score of the eye authentication is calculated, and an authentication score of voiceprint authentication in the case where the user wears the mask is also calculated. The user is identified as him/herself if both the authentication scores are 90 or higher.

Figure 11:
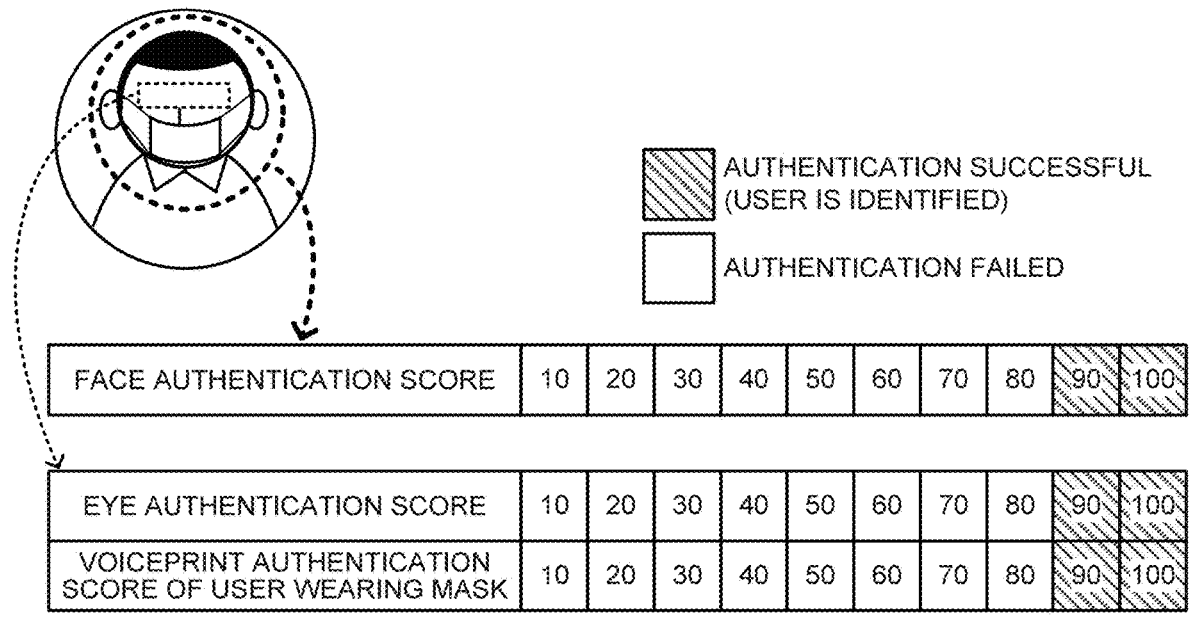
FIG. 11 illustrates switching from face authentication to eye authentication.

FIG. 11 illustrates switching from the face authentication to the eye authentication. As shown in FIG. 11, when the authentication score of the face authentication using the entire face image is 90 or higher, the user can be identified as him/herself. However, when the user wears a mask, the authentication score is reduced because a part of the face is hidden, which makes authentication of the user impossible. Therefore, when wearing of a mask has been detected, eye authentication and voiceprint authentication are used in combination, and the user is identified as him/herself if the scores of both the authentications are 90 or higher.

Figure 12:
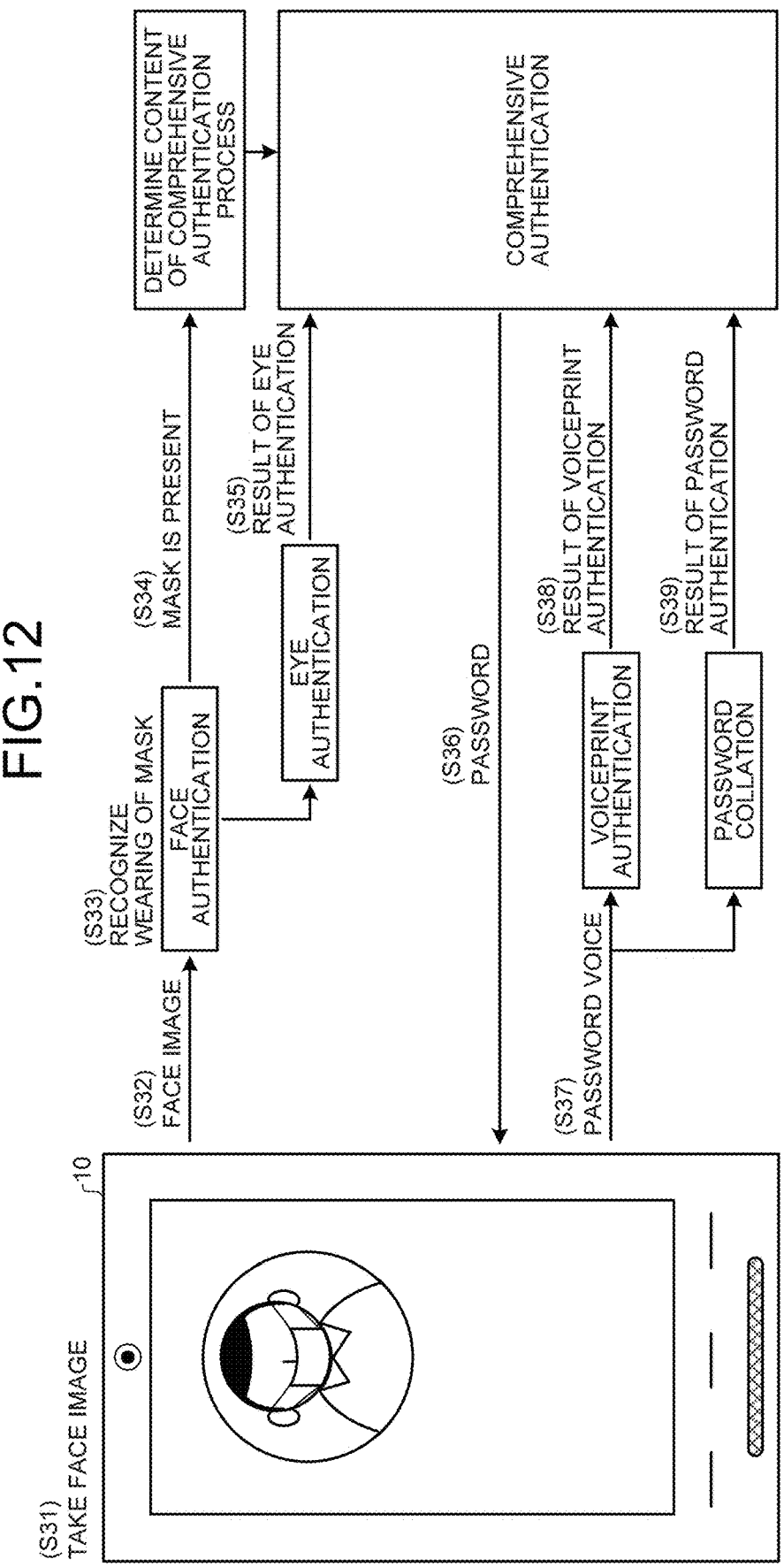
FIG. 12 illustrates authentication processing when a user wears a mask.

FIG. 12 illustrates authentication processing when the user wears a mask. Firstly, the terminal device 10 takes a face image of the user (S31), and transmits the face image to the server device 20 (S32). The server device 20 analyzes the face image and recognizes wearing of a mask (S33). The server device 20 determines the content of the comprehensive authentication process under the condition that there is a mask (S34). Specifically, the server device 20 switches from the authentication using the face image to the comprehensive authentication in which the eye authentication and the voiceprint authentication are combined. The eye authentication using a part around eyes in the face image is performed, and the result thereof is used for the comprehensive authentication (S35).

Furthermore, the server device 20 transmits a password to the terminal device 10 (S36), and the user is requested to utter the displayed password. The terminal device 10 transmits a voice of the user uttering the password, as a password voice, to the server device 20 (S37). The password voice is used for voiceprint authentication and password collation, and the result of the voiceprint authentication (S38) and the result of the password collation (S39) are used for the comprehensive authentication.

As described above, when it is detected that a user is wearing a mask, switching is performed from the authentication using only the face authentication to the multi-factor authentication including the eye authentication and the voiceprint authentication. This switching realizes highly accurate authentication even when the user wears a mask. The authentication for a user wearing a mask is applicable to entry/exit management in an operating room or a food processing factory, for example.

Next, a modification of voiceprint authentication will be described with reference to FIG. 13. For example, when authentication of the user is performed at a teller counter of a financial institution, it is conceivable that a teller performs the authentication while serving the user. In this case, a voice of the user and a voice of the teller may be mixed in acquired voice data, which may cause reduction in accuracy of the voiceprint authentication.

Figure 13:
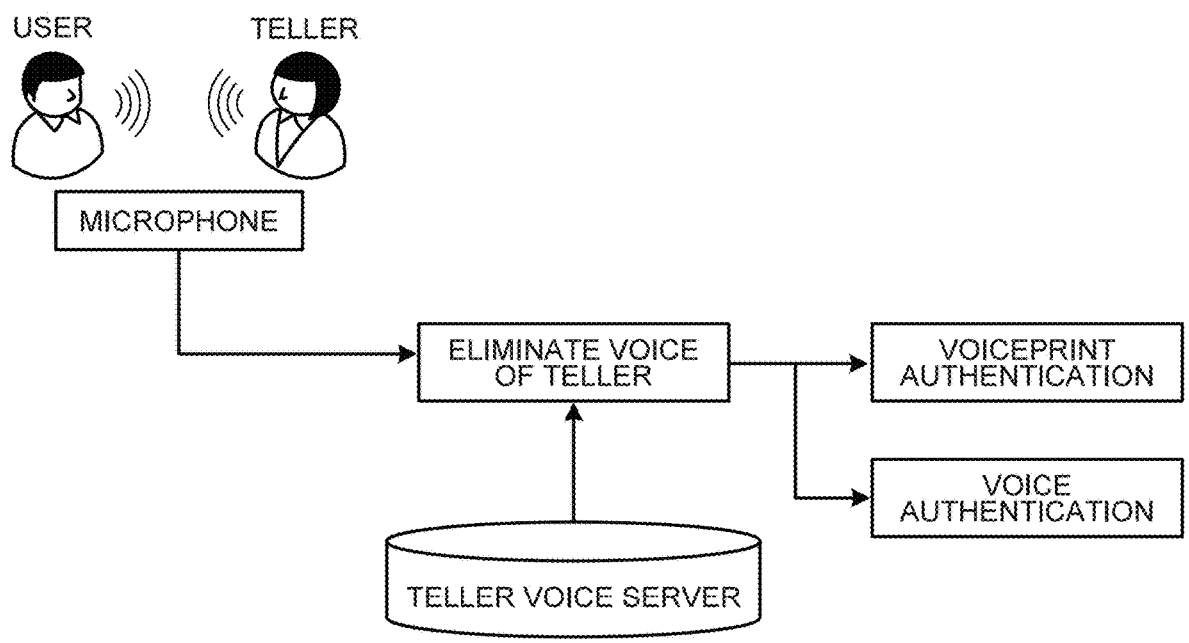
FIG. 13 illustrates a modification of voiceprint authentication.

Therefore, as shown in FIG. 13, the voice of the teller has been stored in a teller voice server, and the voice of the teller is eliminated from the voice acquired by the microphone, whereby the voiceprint authentication can be performed by selecting and using the voice of the user. The voice data from which the voice of the teller has been eliminated can also be used for voice recognition for specifying the content of utterance of the user. For example, a message, a password, personal identification information, and the like being specified by the voice recognition can contribute to authentication of the user and service to be performed by the teller.

Figure 14:
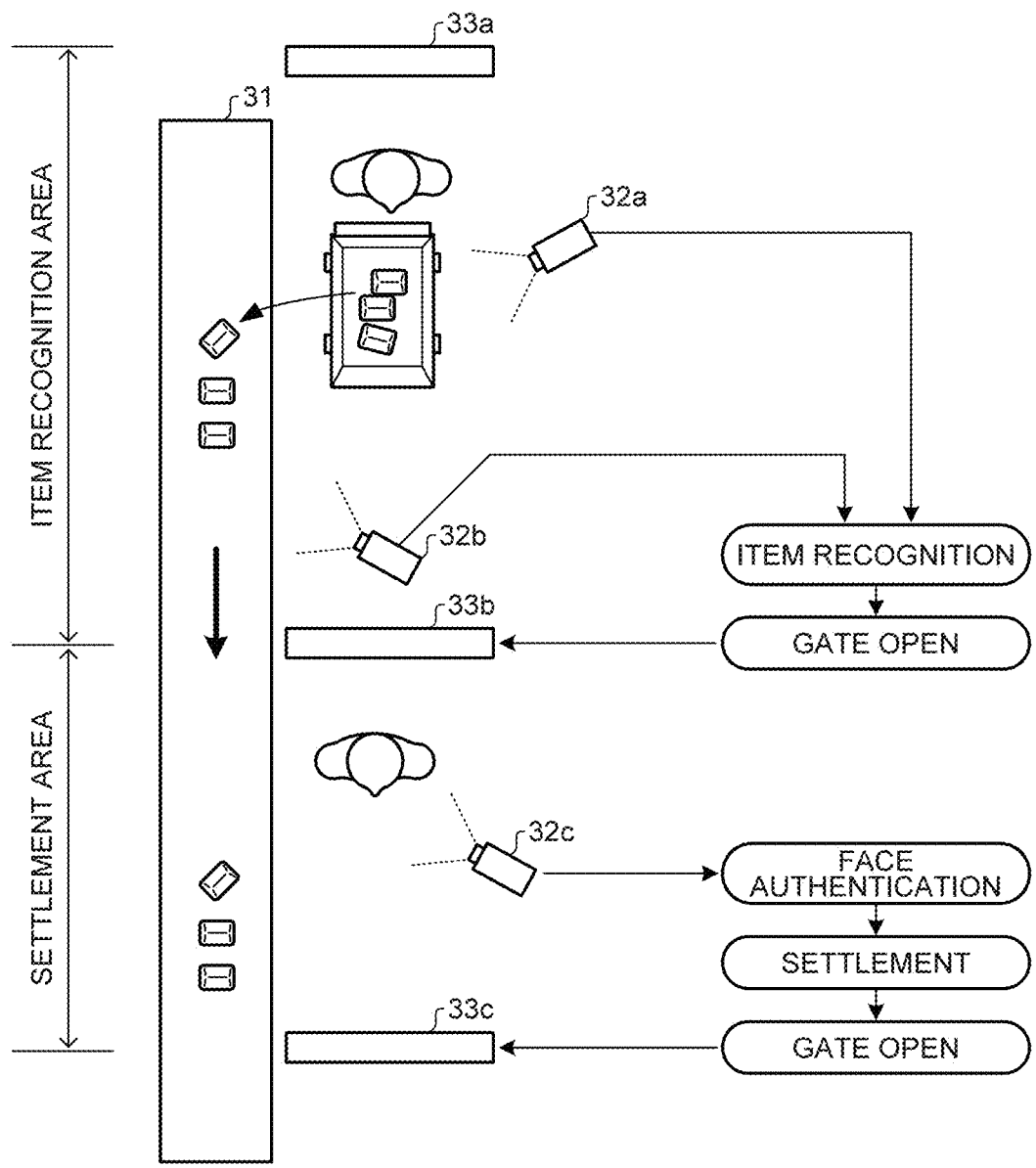
FIG. 14 illustrates a case where authentication is used for settlement of purchase.

Next, a case where authentication is used for settlement of purchase will be described with reference to FIG. 14. In FIG. 14, the user finds desired items in a store, puts the items in a shopping cart, and opens a gate 33a to enter an item recognition area.

The item recognition area is provided with a belt conveyer 31, and the user takes out the items from the cart and puts them on the belt conveyer 31. The item recognition area is provided with a camera 32a for taking an image of items in a cart, and a camera 32b for taking an image of items put on the belt conveyer 31. A server device not shown in FIG. 14 performs image processing on the images taken by the camera 32a and the camera 32b. After the server device determines that all the items in the cart have been put on the belt conveyer 31, the server device recognizes the items, calculates a settlement amount, and opens a gate 33b to a settlement area. The belt conveyer 31 conveys the items to the settlement area.

When the user moves to the settlement area, the camera 32c takes a face image of the user, and the server device performs face authentication. Then, the server device performs a settlement process for the settlement amount by using the result of the face authentication, and credit card information registered in advance, and opens a gate 33c. Thereafter, the user packs the items on the belt conveyer 31 into a bag or the like, and leaves the store.

In the above configuration, the gates are closed in the basic states, and are opened in conjunction with the item recognition and the settlement. However, this configuration may be changed as appropriate. For example, the gates may be opened in the basic states, and may be closed when the item recognition and the settlement are not appropriately performed. The gates may not necessarily be provided.

In addition, the result of imaging by the camera 32a can be used for prediction of a time required until the settlement is finished. Furthermore, a family relationship, such as parent-child relationship, may be recognized by authentication, so that items put on the belt conveyer 31 by persons belonging to the same family can be collectively settled. Moreover, entry of an unauthorized person into the area may be detected by authentication, and the detection result may be reported to a predetermined report destination or this abnormal state may be notified to an administrator of the store.

Figure 15:
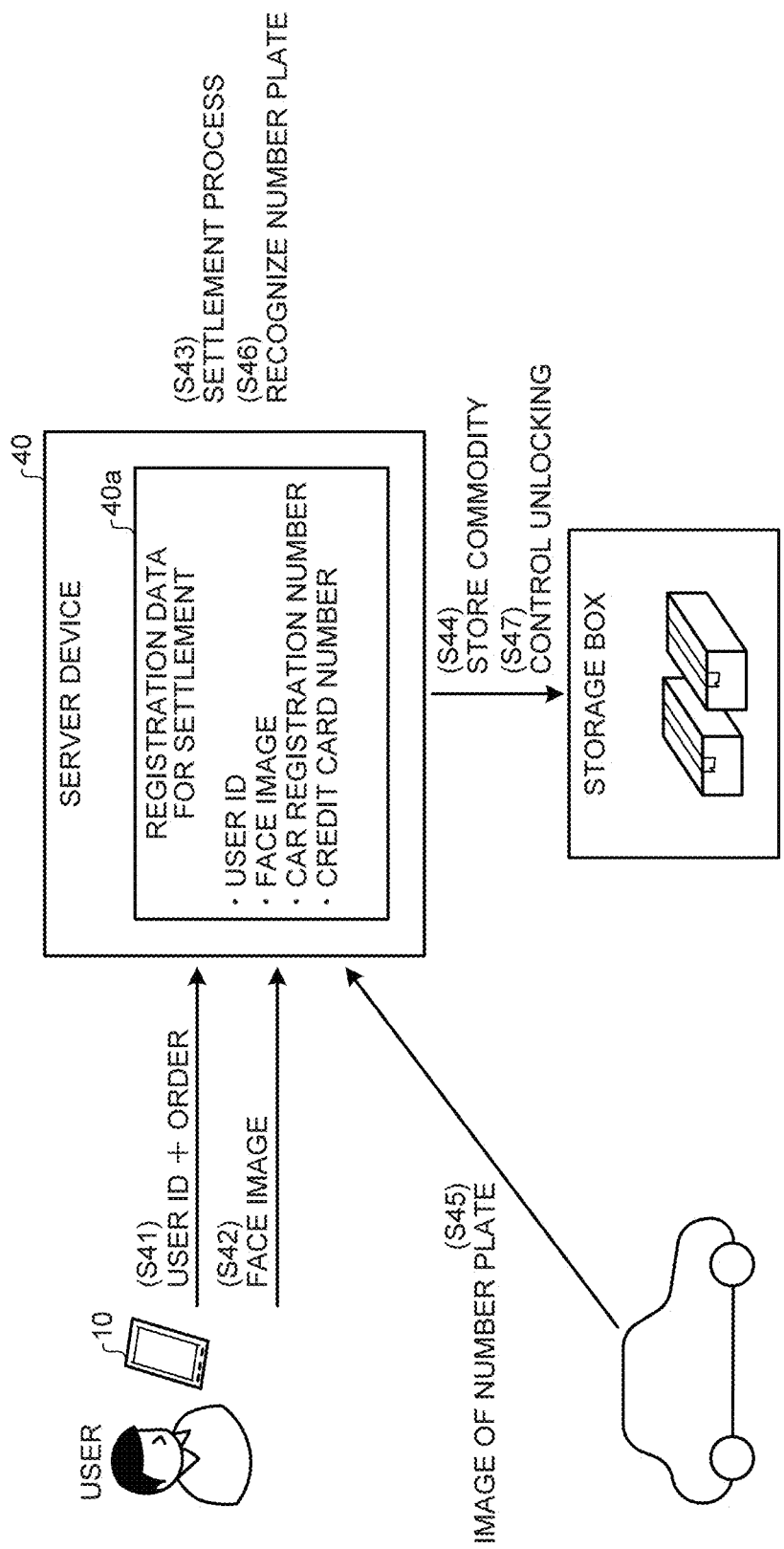
FIG. 15 illustrates a usage example in which a user is combined with identification of a vehicle.

FIG. 15 illustrates an example in which authentication of a user is combined with recognition of a vehicle. In a system shown in FIG. 15, when the user has ordered an item through a network or the like, the item is stored in a storage box. When the user visits the store by a vehicle to receive the item, the storage box is automatically unlocked.

Specifically, the user registers, in advance, a user ID, a face image, a car registration number on a number plate, a credit card number, and the like, as registration data for settlement 40a, in a server device 40.

When the user purchases the item, the user accesses the server device 40 from the terminal device 10, transmits the user ID and an order of the item to the server device 40 (S41), and transmits the face image or the like of the user to the server device 40 (S42).

The server device 40 performs a settlement process on the condition that authentication using the face image or the like has been successful (S43), stores the item in the storage box (S44), and locks the storage box. Thereafter, when the user visits the store by the vehicle, the server device 40 takes an image of the vehicle to acquire an image of the number plate (S45), recognizes the number plate (S46), and unlocks the corresponding storage box (S47).

The system configuration shown in FIG. 15 is merely an example, and any configuration combining authentication of a user and recognition of a number plate can be used. For example, when the configuration is applied to a drive-through system, an order of an item is received in advance, the item is prepared by using number plate recognition, settlement is performed by using face authentication, and the item is hand-delivered by a store clerk.

Figure 16:
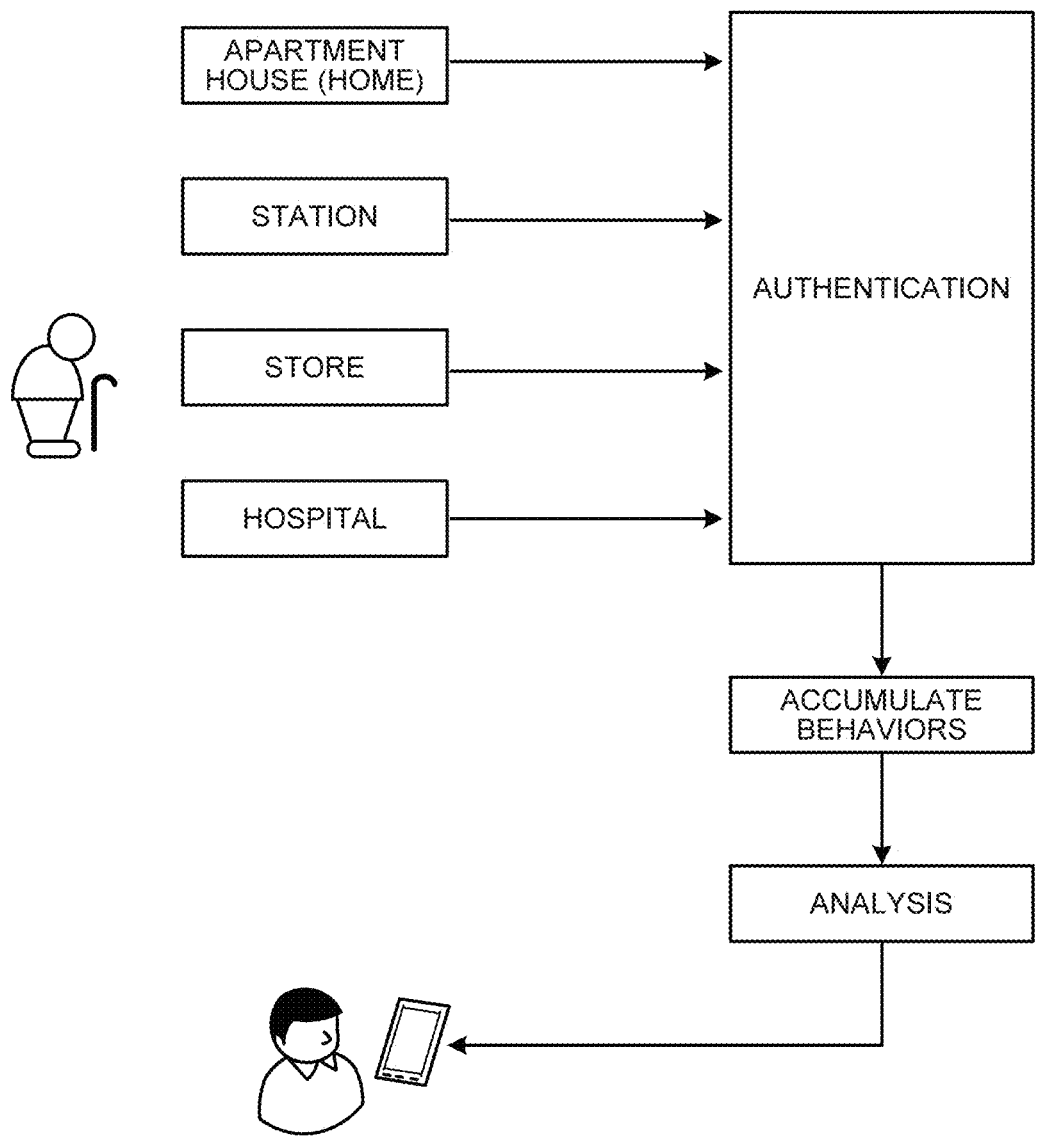
FIG. 16 illustrates a case where authentication results of a user are accumulated to be used for notification to a person related to the user.

FIG. 16 illustrates a case where authentication results of a user are accumulated to be used for notification to a person related to the user. The accumulated authentication results of the user allow analysis of behaviors of the user, and allow notification to the related person when something wrong has happened to the user.

Specifically, authentication of the user is performed in an apartment house, a station, a store, a hospital, and the like. In the apartment house, unlocking control of an entrance can be realized by face authentication with a camera installed at the entrance, and voice authentication or the like. If the user lives in such an apartment house, it is possible to know whether the user is/was at home or out, from the history of unlocking. Likewise, it is also possible to know when the user passed through a ticket gate at which station. Moreover, it is also possible to know what item the user purchased in which store, and when the user went to which hospital.

Since the behaviors of the user are accumulated by using the authentication results and analyzed as described above, something wrong that has happened to the user can be detected. For example, when the user is an elderly person, it is possible to provide a remote care service to detect a change, such as regularity of his/her behaviors being disordered or lost, frequency or amount of his/her shopping being increased, and notify his/her family of the detected result. It is needless to say that this service is applicable not only to the elderly person but also to children and the like.

Figure 17A:
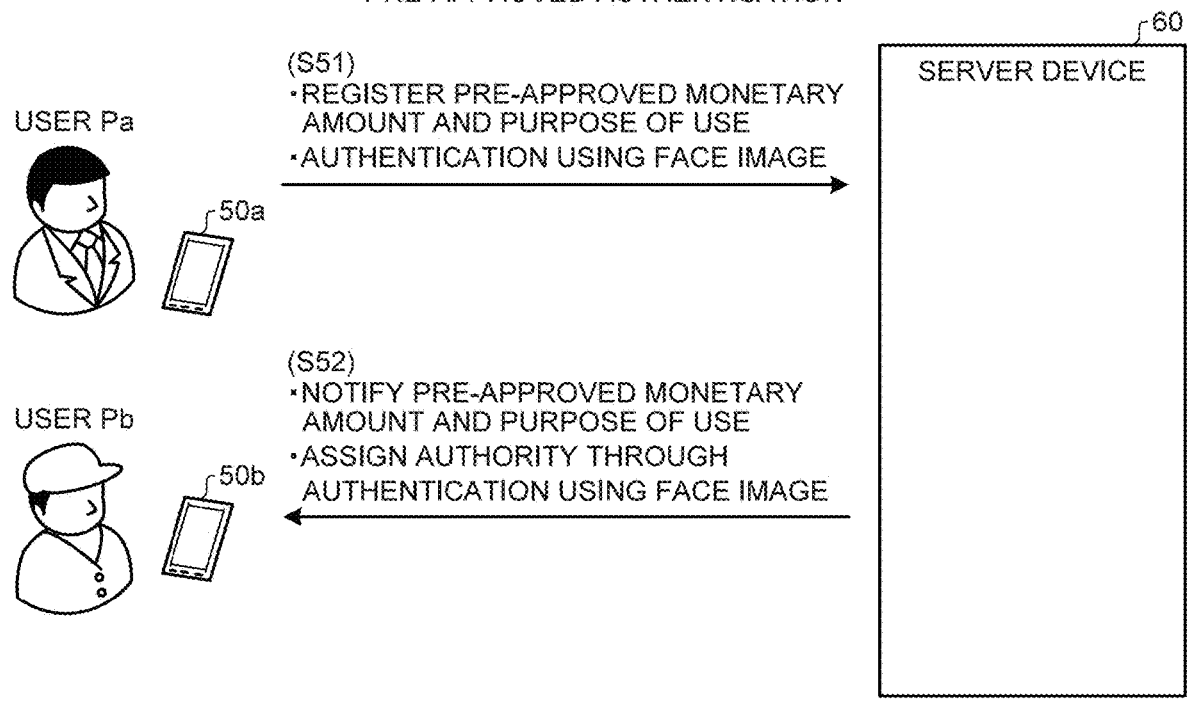
FIG. 17A illustrates a case where authentication is used for assignment of authority.

FIG. 17 illustrates a case where authentication is used for assignment of authority. FIG. 17 illustrates a case where a user Pb uses an account of a user Pa. Firstly, as shown in FIG. 17A, the user Pa accesses a server device 60 from a terminal device 50*a*, and performs registration of a pre-approved monetary amount and the purpose of use, and authentication using a face image (S51). The server device 60 notifies a terminal device 50*b* possessed by the user Pb of the pre-approved monetary amount and the purpose of use, and performs assignment of authority on the condition that authentication using a face image of the user Pb is performed (S52).

Figure 17B:
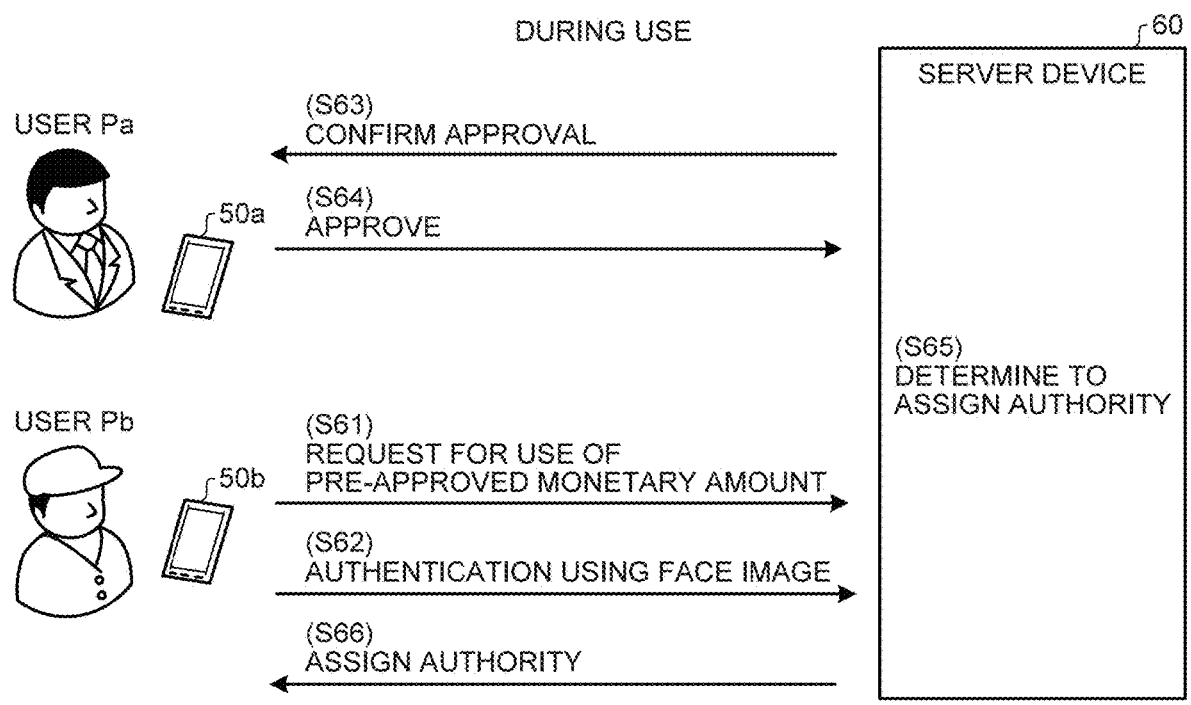
FIG. 17B illustrates a case where authentication is used for assignment of authority.

During use, as shown in FIG. 17B, the user Pb accesses the server device 60 from the terminal device 50*b*. The user Pb performs a request for use of the pre-approved monetary amount (S61), and authentication using a face image of the user Pb (S62). The server device 60 transmits confirmation of approval to the terminal device 50*a* of the user Pa (S63). Upon receiving an approval operation from the terminal device 50*a* (S64), the server device 60 determines assignment of authority to the user Pb (S65), and assigns the authority to the user Pb (S66).

The user Pb, having been assigned the authority, can use money within the balance in the account of the user Pa within the range of the pre-approved monetary amount and the purpose of use. The process shown in FIG. 17 is merely an example, and can be appropriately modified. For example, the user Pa and the user Pb may use the same terminal device. The pre-approval is not performed, and the user Pa may perform approval in response to a request from the user Pb. If the pre-approval has been performed, confirmation thereof during the use may not be required. If the confirmation during the use is not necessary, the user Pa can give the authority to the user Pb before the user Pa dies, for example. Moreover, a plurality of persons may be requested to make confirmation when the user Pb uses money within the balance in the account. The authority may be assigned to the user Pb after another related person agrees with the approval by the user Pa.

FIG. 18 illustrates a case where authentication is used for regular use of transportation. Firstly, the user accesses the server device 70 from the terminal device 10, and registers user data, authentication data, settlement data, and commuter pass data (S71).

The user data indicates the name, attribute (e.g., student or not), contact, and the like of the user. The authentication data is used for authentication of the user, and an example shown in FIG. 18 includes at least a face image. The settlement data is a credit card number or the like, and is used for purchasing a commuter pass and paying the fare. The commuter pass data relates to regular use of transportation, and includes a section and an expiration date. FIG. 18 shows an example of a bus commuter pass.

A bus 71 is provided with a camera 72 for taking images of passengers. When a user, who has performed registration regarding the regular use, gets on the bus 71, the camera 72 takes an image of the user and transmits a face image to the server device 70 (S72).

The server device 70 authenticates the user by using the received face image (S73). When the authentication has been successful, the server device 70 specifies the corresponding commuter pass data, and confirms whether or not the commuter pass data is appropriate (S74). Then, the server device 70 performs settlement according to need (S75), and notifies the bus 71 of the processing result (S76).

The user authentication and processing can be set as appropriate according to the service of the bus 71. For example, the expiration date of the commuter pass data may be checked when the user gets on the bus 71, and authentication may be performed to confirm the section when the user gets off the bus 71. If the expiration date has passed, boarding by the authentication is rejected, and boarding by paying cash or the like is requested. When the user gets off, if it is determined that the user is outside the section indicated in the commuter pass data, settlement is performed to charge a normal fare for the section outside the section indicated in the commuter pass data. This settlement may be performed by using the settlement data, or by cash.

As for setting of the commuter pass data, a commuter pass may be newly purchased by using the settlement data, or commuter pass data of an existing commuter pass may be taken over. For example, when commuter pass data of an IC card type commuter pass is taken over, the terminal device 10 reads out the commuter pass data from the IC card type commuter pass, and transmits the data to the server device 70. When a paper commuter pass is taken over, the user performs a procedure at a predetermined ticket window.

Since update of the commuter pass data can be performed from the terminal device 10, the user need not go to the ticket window for the procedure. Furthermore, when the expiration date of the commuter pass data is approaching, the terminal device 10 may notify the user of this fact, or may automatically update the commuter pass data.

Not only the commuter pass data but also the authentication data such as a face image may be given an expiration date. The expiration date of the authentication data may be confirmed at the time of authentication, and the user may be prompted to update the data when the expiration date is approaching.

As described above, the authentication for the regular use of transportation can prevent the user from showing a commuter pass to a crew, or holding the commuter pass over a reader device, thereby enhancing convenience. Moreover, the user can purchase and update the commuter pass through the terminal device 10, and therefore the user needs not go to the ticket window. The transportation system only needs to install the camera 72 and a terminal device having a communication function, and therefore can introduce the system at low cost.

In FIG. 18, the authentication system is applied to the bus, but the authentication system is also applicable to a train ticket gate. The authentication system is applicable not only to transportation but also to an annual pass of a theme park, for example. In FIG. 18, authentication using a face image has been described, but another authentication may be used, and the authentication may be multi-factor authentication. Moreover, precise authentication may be performed by requesting a photograph on a driver's license or the like at the time of registration for the service, and only face authentication may be performed when the user gets on and off to use the transportation.

As described above, in an exemplary embodiment, an authentication system acquires a plurality of types of authentication information, performs a plurality of types of authentication, obtains a comprehensive authentication result by using the authentication results, and controls stepwise the range of operations to be permitted for the user, according to the comprehensive authentication result. Therefore, flexible use of authentication according to the purpose can be realized without imposing excessively strict authentication on a low security operation, whereby convenience can be enhanced.

Specifically, the authentication system according to the present embodiment calculates, as evaluation values, the results of the plurality of types of authentication. The authentication system adds up the plurality of evaluation values as the results of the plurality of types of authentication to calculate a comprehensive evaluation value. The authentication system provides permission to the user corresponding to the comprehensive evaluation value.

The comprehensive evaluation value may be calculated on the condition that an evaluation value of a predetermined type of authentication, among the plurality of types of authentication, exceeds a threshold that is previously set for the evaluation value. The comprehensive evaluation value may be calculated by applying weights to the evaluation values of the plurality of types of authentication, and adding up the evaluation values.

If the comprehensive evaluation value is insufficient for an operation required by the user, additional authentication can be performed, and whether or not to permit the operation required by the user is controlled by using the result of the additional authentication. Therefore, for example, even if a high security operation has been prohibited due to an environment with insufficient brightness or loud noise, the high security operation may be permitted by performing the additional authentication. Thus, flexible use of the authentication according to the situation can be realized, thereby enhancing convenience.

When the evaluation values of the plurality of types of authentication are added up, it is also possible to make the weights applied to each evaluation value different from each other according to the authentication information acquisition environment.

When the face image of the user is acquired as authentication information, the way of obtaining the comprehensive authentication result may be varied according to presence/absence of a mask being worn in the face image. For example, when there is a mask being worn by a user, the comprehensive authentication result is obtained while placing greater importance on the result of authentication using a factor other than the face image. Alternatively, when there is a mask being worn by a user, the comprehensive authentication result is obtained by using the result of partial face authentication in which an area around eyes is intensively used.

When the face image of the user is acquired as authentication information, a model face image corresponding to the acquired face image can be displayed to the user. At this time, the area and orientation of the model face image can be determined in accordance with the area and orientation of the user's face in the acquired face image. Moreover, when a specific condition has been satisfied, a model face image having a shape corresponding to the specific condition may be displayed.

In the above embodiment, for simplifying the description, the operation range is controlled in two stages by using two thresholds (low score threshold and high score threshold). However, for example, score thresholds in a plurality of stages such as ten stages may be set, and the respective stages may be assigned corresponding security operations.

In one aspect of the present disclosure, an authentication system using a plurality of types of authentication includes: an authentication information acquisition unit configured to acquire pieces of authentication information corresponding to the plurality of types of authentication; a comprehensive authentication unit configured to obtain a comprehensive authentication result from results of the plurality of types of authentication performed by using the pieces of authentication information; and an operation control unit configured to control stepwise a range of operations to be permitted for a user, based on the authentication result obtained by the comprehensive authentication unit.

In the above configuration, the plurality of types of authentication respectively output evaluation values as authentication results, the comprehensive authentication unit adds up the evaluation values as the results of the plurality of types of authentication to calculate a comprehensive evaluation value, and the operation control unit controls the range of the operations to be permitted for the user, based on the comprehensive evaluation value.

In the above configuration, on a condition that an evaluation value of a predetermined type of authentication, among the plurality of types of authentication, exceeds a threshold that is set for the evaluation value, the comprehensive authentication unit applies weights to the evaluation values of the plurality of types of authentication and adds up weighted evaluation values to calculate the comprehensive evaluation value.

In the above configuration, the comprehensive authentication unit performs additional authentication when the comprehensive evaluation value is insufficient for an operation required by the user, and controls whether or not to permit the operation required by the user, based on a result of the additional authentication.

In the above configuration, the comprehensive authentication unit makes the weights, which are applied to the evaluation values of the plurality of types of authentication before the evaluation values are added up, different from each other based on acquisition environment of the authentication information.

In the above configuration, the comprehensive authentication unit determines, based on the authentication information, the acquisition environment of the authentication information.

In the above configuration, the authentication information acquisition unit acquires, as the authentication information, a face image of the user, and the comprehensive authentication unit varies a way of obtaining the comprehensive authentication result, based on presence/absence of a mask being worn by the user in the face image.

In the above configuration, when there is a mask being worn by the user, the comprehensive authentication unit obtains the comprehensive authentication result while placing greater importance on a result of authentication using a factor other than the face image.

In the above configuration, when there is a mask being worn by the user, the comprehensive authentication unit obtains the comprehensive authentication result by using a result of partial face authentication for which an area around eyes is intensively used.

In the above configuration, the authentication system further includes a model face image display unit configured to, when the authentication information acquisition unit has acquired a face image of the user as the authentication information, display a model face image corresponding to the acquired face image, to the user.

In the above configuration, the model face image display unit determines an area and an orientation of the model face image in accordance with an area and an orientation of the acquired face image.

In the above configuration, when a specific condition has been satisfied, the model face image display unit displays a model face image having a shape corresponding to the specific condition.

Figure 19:
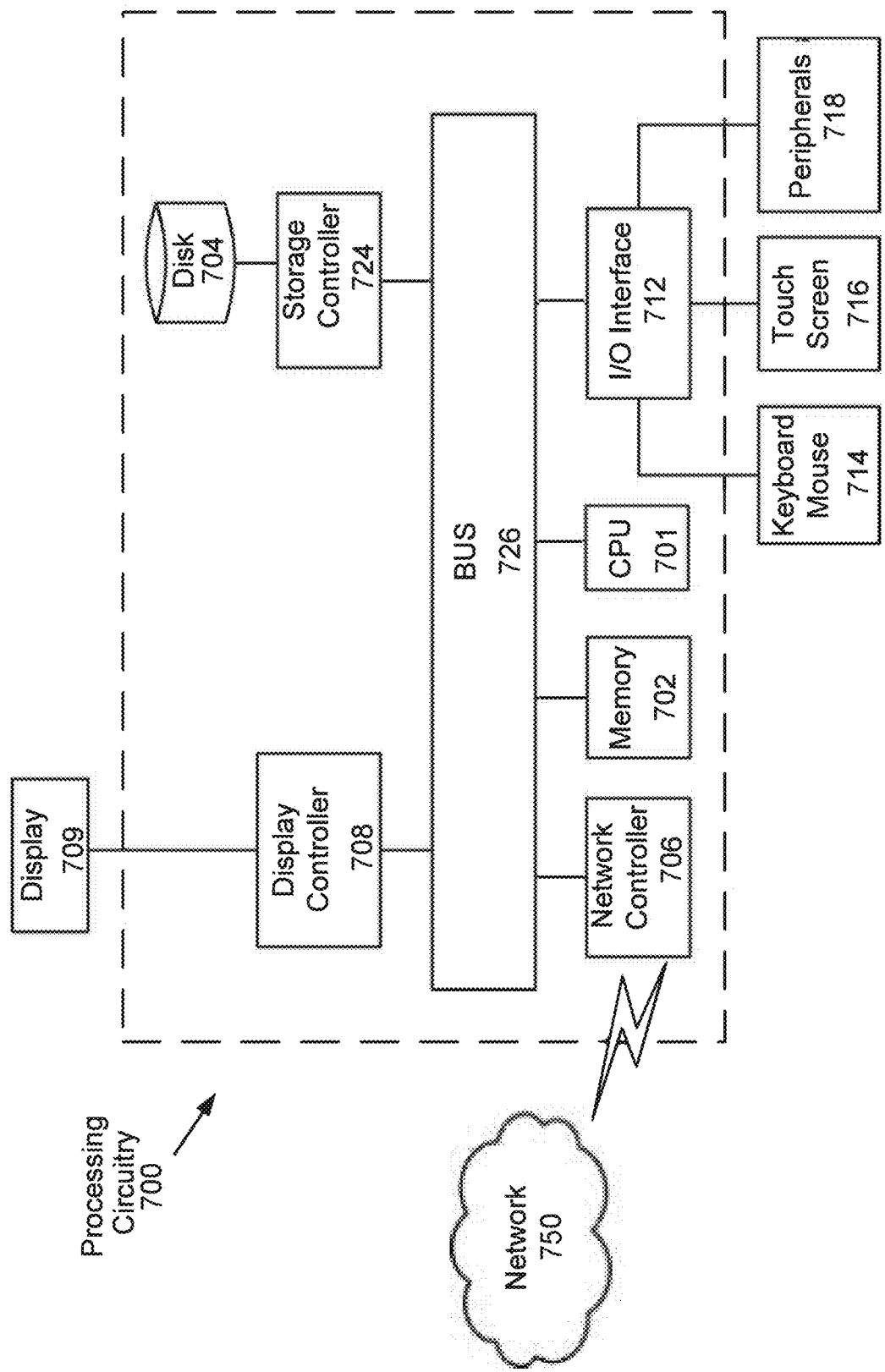
FIG. 19 is a block diagram of processing circuitry that performs computer-based operations in accordance with the present disclosure.

FIG. 19 is a block diagram of processing circuitry that performs computer-based operations in accordance with the present disclosure. FIG. 19 illustrates processing circuitry 700 is included in or encompasses control unit 16, which is a component of terminal device 10. Additionally, processing circuitry 700 which is included in or encompasses control unit 25, which is a component of server device 20.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 19, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 19. A processing circuit also includes devices such as an application specific integrated circuit (ASIC) and conventional circuit components arranged to perform the recited functions.

In FIG. 19, the processing circuitry 700 may be a computer or a particular, special-purpose machine. Processing circuitry 700 is programmed to execute processing to control terminal device 10/server device 20.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 19 also includes a network controller 706, such as an Ethernet PRO network interface card, for interfacing with network 750. As can be appreciated, the network 750 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 750 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 709. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In one aspect of the present disclosure, an authentication method using a plurality of types of authentication includes: acquiring pieces of authentication information corresponding to the plurality of types of authentication; obtaining a comprehensive authentication result from results of the plurality of types of authentication performed by using the pieces of authentication information; and controlling stepwise a range of operations to be permitted for a user, based on the authentication result obtained in the obtaining.

According to the present disclosure, it is possible to enhance convenience in an authentication system using a plurality of types of authentication.

The constituent elements described in the above embodiment are conceptually functional constituent elements, and thus may not necessarily be configured as physical constituent elements, as illustrated in the drawings. That is, distributed or integrated forms of each device are not limited to the forms illustrated in the drawings, and all or some of the forms may be distributed or integrated functionally or physically in any unit depending on various loads, use statuses, or the like.

The invention claimed is:

1. An authentication system for authentication of a user, comprising:
   authentication information acquisition circuitry configured to acquire from the user pieces of authentication information corresponding to a plurality of types of authentication;
   comprehensive authentication circuitry configured to
      obtain a comprehensive authentication result from results of the plurality of types of authentication performed by using the pieces of authentication information, wherein the plurality of types of authentication respectively output evaluation values as authentication results, and the comprehensive authentication circuitry adds up the evaluation values to calculate a comprehensive evaluation value without averaging the evaluation values, and
      on a condition that an evaluation value of a predetermined type of authentication, among the plurality of types of authentication, exceeds a threshold that is set for the evaluation value, apply weights to the evaluation values of the plurality of types of authentication and add up weighted evaluation values to calculate the comprehensive evaluation value; and
   operation control circuitry configured to control stepwise a range of operations to be permitted for the user, based on the comprehensive evaluation value obtained by the comprehensive authentication circuitry, wherein the operation control circuitry is configured to:
      permit all operations including a high security operation when the comprehensive evaluation value exceeds a first threshold,
      permit only a part of the operations excluding the high security operation when the comprehensive evaluation value is lower than or equal to the first threshold but higher than a second threshold, and
      prohibit all operations when the comprehensive evaluation value is lower than or equal to the second threshold.

2. The authentication system according to claim 1, wherein
   the comprehensive authentication circuitry performs additional authentication when the comprehensive evaluation value is insufficient for an operation required by the user, and controls whether or not to permit the operation required by the user, based on a result of the additional authentication.

3. The authentication system according to claim 1, wherein
   the comprehensive authentication circuitry makes weights, which are applied to the evaluation values of the plurality of types of authentication before the evaluation values are added up, different from each other based on acquisition environment of the authentication information.

4. The authentication system according to claim 3, wherein
   the comprehensive authentication circuitry determines, based on the authentication information, the acquisition environment of the authentication information.

5. The authentication system according to claim 1, wherein
the authentication information acquisition circuitry acquires, as the authentication information, a face image of the user, and
the comprehensive authentication circuitry varies a way of obtaining the comprehensive authentication result, based on presence or absence of a mask being worn by the user in the face image.

6. The authentication system according to claim 5, wherein
in response to a mask being worn by the user, the comprehensive authentication circuitry obtains the comprehensive authentication result while placing greater importance on a result of authentication using a factor other than the face image.

7. The authentication system according to claim 5, wherein
in response to a mask being worn by the user, the comprehensive authentication circuitry obtains the comprehensive authentication result by using a result of partial face authentication for which an area around eyes is used.

8. The authentication system according to claim 1, further comprising
model face image display circuitry configured to, in response to the authentication information acquisition circuitry acquiring a face image of the user as the authentication information, display a model face image corresponding to the acquired face image, to the user.

9. The authentication system according to claim 8, wherein
the model face image display circuitry determines an area and an orientation of the model face image in accordance with an area and an orientation of the acquired face image.

10. The authentication system according to claim 8, wherein
in response to a specific condition being satisfied, the model face image display circuitry displays a model face image having a shape corresponding to the specific condition.

11. An authentication method for authentication of a user, comprising:
acquiring from the user pieces of authentication information corresponding to a plurality of types of authentication;
obtaining a comprehensive authentication result from results of the plurality of types of authentication performed by using the pieces of authentication information, wherein the plurality of types of authentication respectively output evaluation values as authentication results, and the evaluation values are added up to calculate a comprehensive evaluation value without averaging the evaluation values;
on a condition that an evaluation value of a predetermined type of authentication, among the plurality of types of authentication, exceeds a threshold that is set for the evaluation value, applying weights to the evaluation values of the plurality of types of authentication and adding up weighted evaluation values to calculate the comprehensive evaluation value;
controlling stepwise a range of operations to be permitted for the user, based on the comprehensive evaluation value obtained in the obtaining, wherein controlling stepwise the range of operations includes
permitting all operations including a high security operation when the comprehensive evaluation value exceeds a first threshold;
permitting only a part of the operations excluding the high security operation when the comprehensive evaluation value is lower than or equal to the first threshold but higher than a second threshold; and
prohibiting all operations when the comprehensive evaluation value is lower than or equal to the second threshold.

12. The authentication method of claim 11, further comprising:
performing additional authentication when the comprehensive evaluation value is insufficient for an operation required by the user; and
controlling whether or not to permit the operation required by the user, based on a result of the additional authentication.

13. The authentication method of claim 11, further comprising:
making weights, which are applied to the evaluation values of the plurality of types of authentication before the evaluation values are added up, different from each other based on acquisition environment of the authentication information.

14. The authentication method of claim 13, further comprising:
determining, based on the authentication information, the acquisition environment of the authentication information.

15. The authentication method of claim 11, further comprising:
acquiring, as the authentication information, a face image of the user; and
varying a way of obtaining the comprehensive authentication result, based on presence or absence of a mask being worn by the user in the face image.

16. The authentication method of claim 15, further comprising:
in response to a mask being worn by the user, obtaining the comprehensive authentication result while placing greater importance on a result of authentication using a factor other than the face image.

* * * * *